United States Patent [19]

Balch et al.

[11] Patent Number: 4,896,090
[45] Date of Patent: Jan. 23, 1990

[54] LOCOMOTIVE WHEELSLIP CONTROL SYSTEM

[75] Inventors: Edgar T. Balch, Erie; Harold S. Hostettler, Jr., Edinboro, both of Pa.; David J. Konko, Dunkirk, N.Y.

[73] Assignee: General Electric Company, Erie, Pa.

[21] Appl. No.: 265,377

[22] Filed: Oct. 31, 1988

[51] Int. Cl.[4] .............................................. B61C 15/08
[52] U.S. Cl. ..................................... 318/52; 388/814; 318/71
[58] Field of Search ........................ 318/51, 52, 55, 56, 318/66, 67, 71, 69, 77, 138, 139, 268, 269, 270, 271; 388/812, 814, 805, 811, 831, 832; 303/91, 93–95, 96, 100, 103, 105, 108, 109

[56] References Cited

U.S. PATENT DOCUMENTS

| | | | |
|---|---|---|---|
| 3,210,630 | 10/1965 | Zelina | 318/52 |
| 3,437,896 | 4/1969 | Hoge | 318/52 |
| 3,482,887 | 12/1969 | Sheppard | 303/21 |
| 3,541,406 | 11/1970 | Etienne | 318/52 |
| 3,728,596 | 4/1973 | Hermansson et al. | 318/52 |
| 3,982,164 | 9/1976 | de Buhr et al. | 318/52 |
| 4,035,698 | 7/1977 | Soderberg | 318/52 |
| 4,075,538 | 2/1978 | Plunkett | 318/52 |
| 4,164,872 | 8/1979 | Weigl | 318/52 X |
| 4,292,572 | 9/1981 | Ivy | 318/52 |
| 4,335,337 | 6/1982 | Okamatsu et al. | 318/52 |
| 4,463,289 | 7/1984 | Young | 318/52 |
| 4,588,932 | 5/1986 | Riondel | 318/52 |

FOREIGN PATENT DOCUMENTS

| | | | |
|---|---|---|---|
| 950559 | 7/1974 | Canada . | |
| 89899 | 9/1983 | European Pat. Off. | 318/52 |
| 975467 | 11/1982 | U.S.S.R. | 318/52 |
| 1246053 | 9/1971 | United Kingdom . | |

OTHER PUBLICATIONS

R. Moser, Measures Taken to Assure Optimum Utilization of Adhesion . . . 92 Glas. Ann. 7/8 (1968), pp. 208–218.

Primary Examiner—William M. Shoop, Jr.
Assistant Examiner—A. Jonathan Wysocki
Attorney, Agent, or Firm—A. S. Richardson, Jr.

[57] ABSTRACT

A locomotive propulsion system includes wheelslip control with the following interrelated features: comparing the rotational speeds of the locomotive's separately driven wheels and detecting the highest and lowest; providing a reference speed value indicative of the rotational speed of a wheel that is not slipping; determining a desired maximum difference between the reference speed and a selected one of the detected speeds; deriving a speed error value by summing the reference speed, selected speed, and maximum difference; obtaining a wheelslip correction value which is a function of the speed error value; reducing the magnitude of voltage applied to the locomotive's traction motors in accordance with the correction value.

91 Claims, 12 Drawing Sheets

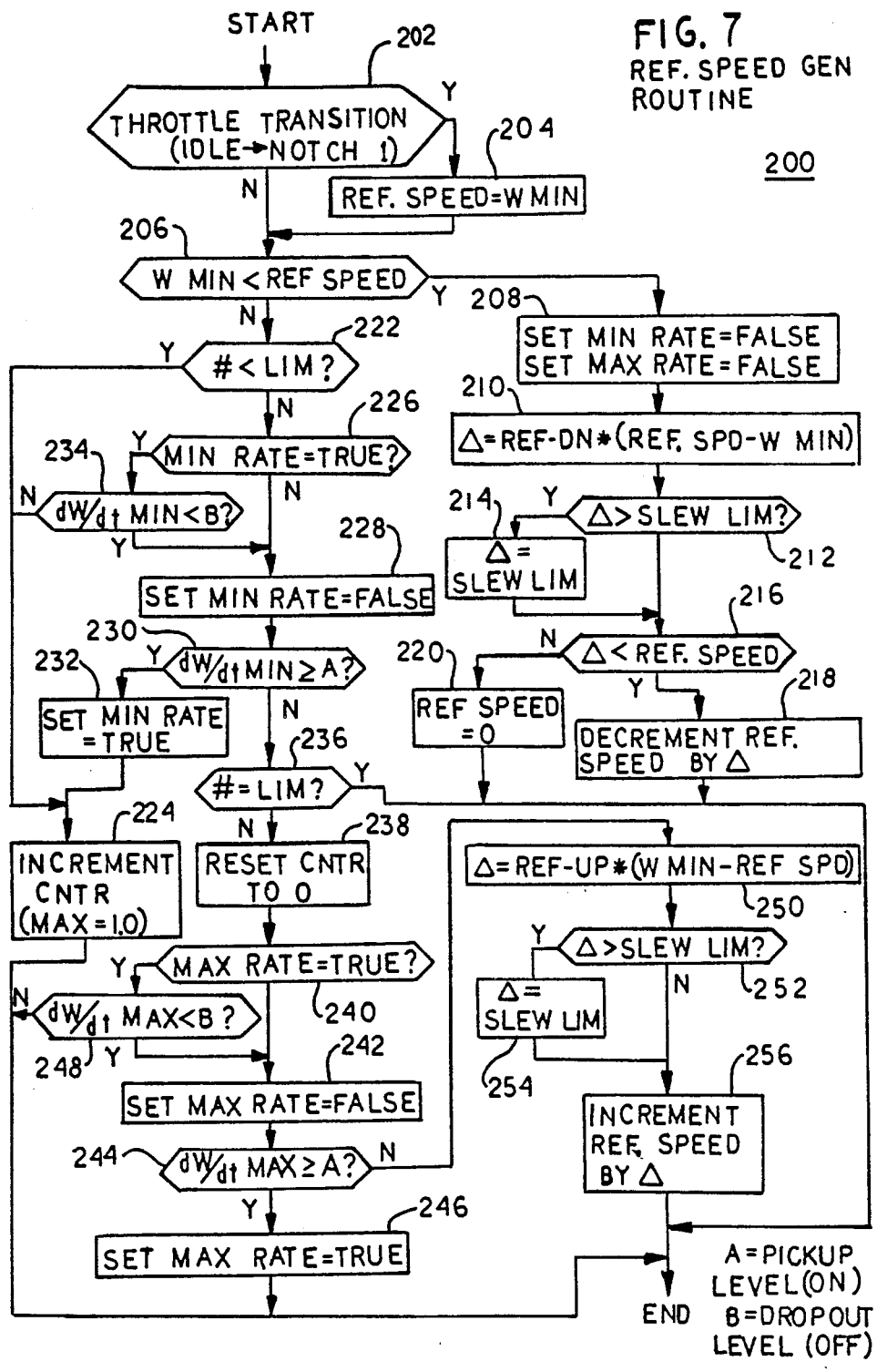

WHEELSLIP MODE
CONTROL ROUTINE

DERATION SUBROUTINE
(FIGS. 8 & 9)

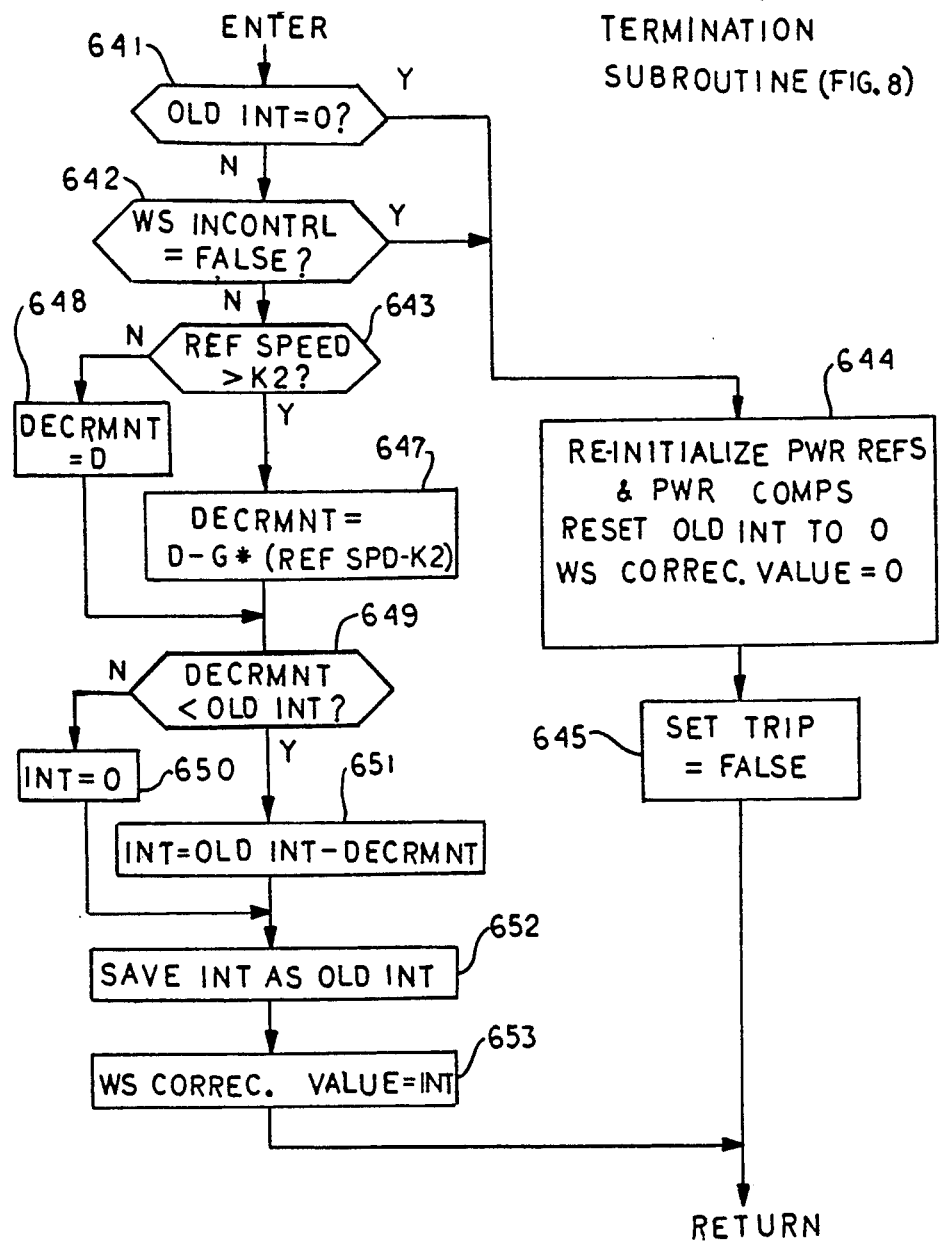
FIG. 12 RECOVERY/TERMINATION SUBROUTINE (FIG. 8)

REF VALUE REDUCING SUBROUTINE
(FIG. 13)

LOCOMOTIVE WHEELSLIP CONTROL SYSTEM

BACKGROUND OF THE INVENTION

This invention relates generally to control systems for electrically propelling traction vehicles such as diesel-electric or straight electric locomotives, and it relates more particularly to improved means for controlling such a vehicle in a manner that avoids or minimizes undesirable slippage of the vehicle wheels when "motoring" (propulsion mode of operation) or "braking" (dynamic retardation mode of operation).

Modern locomotives and other large self-propelled traction vehicles commonly have, per vehicle, at least four axle-wheel sets (each set comprising a pair of wheels affixed to opposite ends of a rotatably mounted axle), with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), thereby propelling the vehicle in a desired direction along the right of way. Alternatively, in an electrical braking mode of operation, the motors serve as axle-driven electrical generators; torque is applied to their shafts by their respectively associated axle-wheel sets which then exert braking effort on the surface, thereby retarding or slowing the vehicle's progress. In either case, good adhesion between each wheel and the surface is required for efficient operation of the vehicle.

It is well known that maximum tractive or braking effort is obtained if each powered wheel of the vehicle is rotating at such an angular velocity that its actual peripheral speed is slightly higher (motoring) or slightly lower (braking) than the true vehicle speed (i.e., the linear speed at which the vehicle is traveling, usually referred to as "ground speed" or "track speed"). The difference between wheel speed and track speed is referred to as "slip speed." There is a relatively low limit value of slip speed at which peak tractive or braking effort is realized. This value, commonly known as maximum "creep speed," is a variable that depends on track speed rail conditions. So long as the maximum creep speed is not exceeded, slip speed is normal and the vehicle will operate in a stable microslip or creep mode.

As a practical matter there are times when, due to a deterioration of rail conditions or to an untoward increase in torque, wheel-to-rail adhesion tends to be reduced or lost and some or all of the vehicle wheels will slip excessively, i.e., the actual slip speed will be greater than the maximum creep speed. Such a wheelslip condition, which is characterized in the motoring mode by one or more spinning axle-wheel sets and in the braking mode by one or more sliding or skidding axle-wheel sets, can cause accelerated wheel wear, rail damage, high mechanical stresses in the drive components of the propulsion system, and an undesirable decrease of tractive (or braking) effort.

Many different systems are disclosed in the relevant prior art for automatically detecting and recovering from undesirable wheelslip conditions, or for preventing such conditions in the first place. See for example U.S. Pat. Nos. 3,437,896 and 3,728,596. Virtually all wheelslip control or correction systems temporarily reduce or "derate" the traction power in order to cure or to avoid a wheelslip condition. During the period of time that such power reduction is in effect, the productivity of the vehicle is undesirably reduced, and for this reason both the amount of deration and its duration should be minimized.

In normal motoring operation, the propulsion system of a diesel-electric locomotive is so controlled as to establish a balanced steady-state condition wherein the engine-driven alternator produces, for each discrete position of a throttle handle, a substantially constant, optimum amount of electrical power for the traction motors. In practice suitable means are provided for overriding normal operation of the propulsion controls and reducing engine load in response to certain abnormal conditions, such as loss of wheel adhesion or a load exceeding the power capability of the engine at whatever engine speed the throttle is commanding. This response, generally referred to as deration, reduces traction power, thereby helping the locomotive recover from such temporary conditions and/or preventing serious damage to the engine.

In addition, the propulsion control system conventionally includes means for limiting or reducing alternator output voltage as necessary to keep the magnitude of this voltage and the magnitude of load current from respectively exceeding predetermined safe maximum levels or limits. Current limit is effective when the locomotive is accelerating from rest. At low locomotive speeds, the traction motor armatures are rotating slowly, so their back EMF is low. A low alternator voltage can now produce maximum motor current which in turn produces the high tractive effort required for acceleration. On the other hand, the alternator voltage magnitude must be held constant at its maximum level whenever locomotive speed is high. At high speeds the traction motor armatures are rotating rapidly and have a high back EMF, and the alternator voltage must then be high to produce the required load current.

Some of the prior art wheelslip control systems attempt to curtail undesirable wheel slippage by monitoring slip speed and overriding the normal propulsion controls so as to reduce traction power if and when the slip speed exceeds a permissible limit which depends on the magnitude of motor current (and hence total motor torque). See U.S. Pat. No. 4,463,289 and British Pat. No. 1,246,053. Such creep regulators are advantageous because they minimize the duration and severity of wheelslip conditions, thereby enhancing the useful life of the vehicle wheels and the productivity of the vehicle.

Most prior art wheelslip controls use the difference between the rotational speed of the fastest axle-wheel set and the rotational speed of the slowest axle-wheel set to indicate slip speed. This difference is a true measure of slip speed so long as at least one axle-wheel set is not slipping and at least one set is. But if all sets have the same speed, the difference speed will be zero and therefore cannot indicate whether the vehicle is operating properly, with all of its powered wheels rotating at maximum creep speed, or is experiencing a "synchronous" wheelslip condition, with the slip speeds of all axle-wheel sets simultaneously exceeding the maximum creep speed. Various prior art solutions to the problem of detecting synchronous slips are disclosed in U.S. Pat. Nos. 3,210,630; 4,075,538; and 4,588,932, respectively.

Many prior art wheelslip control systems are operative in response to rapid changes of wheel speed. A wheelslip condition is indicated if the rate at which the rotational speed of an axle-wheel set is changing increases above a predetermined threshold rate that somewhat exceeds the maximum acceleration (in the motoring mode) or deceleration (in the braking mode) obtained during normal speed changes of the vehicle. See, for example, U.S. Pat. Nos. 3,541,406; 3,482,887; and 4,035,698.

The creep or slip of each powered wheel of the vehicle can be accurately detected by comparing the speed of the axle-wheel set with the actual ground speed of the vehicle. But this requires equipping the vehicle with suitable means for detecting ground speed such as a radar unit (which is relatively expensive and requires continuous recalibration to avoid errors due to vibration or wheel wear) or an extra, unpowered wheel or roller (which is cumbersome and unreliable).

Another known technique for avoiding wheelslip during motoring is to control or regulate the voltage applied to the traction motors so as to hold maximum creep speed. In U.S. Pat. No. 3,982,164, the maximum voltage limit of an open-loop propulsion control system is set a programmed amount in excess of the synthesized voltage of a non-slipping motor, which programmed amount represents the desired maximum percent slip and is automatically adjusted to maximize the combined motor currents and hence total motor torque. Alternatively, as is shown and described in Canadian Pat. No. 950,559, a closed-loop voltage regulator will tend to arrest incipient wheelslips, and the control loop can also include means for reducing the voltage set point (and hence motor speed) in immediate response to the onset of a wheelslip condition as indicated by excessive slip speed (see page 29 of the referenced Canadian patent).

SUMMARY OF THE INVENTION

A general objective of the present invention is to provide an improved wheelslip control system for an electrically propelled traction vehicle.

Another objective is to provide wheelslip control characterized by its very fast response to the inception of an undesirable wheelslip condition over a wide range of track speed and by its effective suppression of such a condition with a relatively small reduction of tractive (or braking) effort.

A more specific objective of the invention is to provide, for a locomotive propulsion system, wheelslip control means that is effective to initiate deration in response to an incipient synchronous slip condition, thereby obviating the provision of an instrument to measure track speed.

A further objective is the provision, in a wheelslip control system that is compatible with the voltage (speed) regulation approach of the prior art, of improved means for ensuring a quick, smooth and stable recovery from a wheelslip condition.

The improved wheelslip control means is useful in a traction vehicle propulsion system comprising a controllable source of electric power for energizing a plurality of traction motors which respectively drive the wheels of the vehicle, means for varying the magnitude of output voltage (or current) of the source in accordance with a variable control signal, and a controller for varying the control signal as necessary to minimize any difference between a feedback value representative of the actual magnitude of the output voltage (or current) and a reference signal value which normally depends on the power setting of the vehicle throttle (or brake handle). A plurality of suitable speed sensors are respectively associated with the separately driven wheels of the vehicle.

In carrying out the invention in one form, the speed sensors are connected to first means for comparing the rotational speeds of the separately driven wheels and for detecting the highest and lowest speeds, respectively. In association with such first means, second means provides a reference speed value indicative of the rotational speed of a vehicle wheel that is not slipping, and third means determines a normally desired, maximum allowable difference between the reference speed and the highest (or lowest) speed detected by the first means. The wheelslip control means also includes summing means for deriving a speed error value representative of the algebraic sum of the highest (or lowest) speed, the reference speed, and the aforesaid maximum allowable difference. So long as the highest (or lowest) speed has a desired value, the speed error value will be zero, but if it differs from the desired value in a predetermined direction (e.g., if the highest speed were greater than desired), a positive speed error value is derived and an integrator is operative to obtain a wheelslip correction value that increases at an average rate that is a function of the speed error value. Means is provided for reducing the aforesaid reference signal value by an amount corresponding to the correction value, thereby correspondingly derating the propulsion system.

For optimum performance of the propulsion system during any wheelslip condition, the wheelslip control means should cure the wheelslip with the least possible deration (amount and duration). In one aspect of the invention, this is accomplished by supplying the integrator with a voltage error value related to the speed error value by a variable gain that is a predetermined function of the reference speed value, whereby the wheelslip correction value is representative of the time integral of the voltage error value. The variable gain increases from a predetermined minimum limit as the reference speed value increases from zero, and preferably it varies in accordance with approximately the second power of the reference speed so that the wheelslip correction value will cause just enough deration at any vehicle speed to promptly cure a wheelslip condition. At relatively low track speeds, the correction value will have negligible "overshoot," and the average tractive or braking effort will be kept as high as possible over the entire speed range. (Note that if the gain were constant it would have to be sufficiently high to obtain the required decrement of tractive effort per unit of voltage [speed] reduction while the vehicle is traveling at high speeds, but such a high gain would be larger than needed at lower speeds when the ratio of traction motor current [and thus torque] to voltage is higher.)

Also for optimum system performance, the aforesaid third means of the wheelslip control means is operative to vary the normally desired maximum difference speed as a function of the reference speed indicated by the second means. In another aspect of the invention, the third means includes means for preventing the maximum difference speed from decreasing below a certain minimum (e.g., in a range from 0.5 to 1.0 mph) when the reference speed is relatively low, and as the reference speed increases from a predetermined first value (e.g., 10 mph) to a second, higher value (e.g., 17 mph), the third means is effective to vary the maximum difference speed as a decreasing percentage of reference speed. When the vehicle is traveling at speeds above said second value the maximum difference speed tracks the reference speed. Consequently, the normally desired maximum difference speed changes smoothly, as the vehicle accelerates, from a relatively high percentage of reference speed (e.g., approximately 12% at said first value of vehicle speed) to a desirably low percentage (e.g., in the range of 4% to 8% at speeds above said second value). The minimum limit that is imposed on the maximum difference speed when the vehicle is traveling at a very low speed will prevent unnecessary derations that might otherwise be caused by spurious speed error values as the vehicle speed approaches zero.

When the speed error value is no longer positive (indicating that the wheelslip condition has been cured), tractive effort should be restored as quickly as possible. In yet another aspect of the invention, the integrator is operative when the wheelslip correction value is greater than zero and the highest speed is not greater than desired (or the lowest speed is not less than desired) to decrease the correction value to zero at an average rate that is independent of the speed error but dependent on the reference speed. As the correction value decreases, the value of the aforesaid reference signal rises, and therefore tractive (or braking) effort is restored. Preferably the rate of decrease varies with the reference speed so long as the reference speed exceeds a predetermined relatively low value (e.g., 7 mph). The relationship between the recovery rate and the reference speed is so selected that power will be restored at a desired constant rate (e.g., 50 HP per second per powered axle) so long as the vehicle is traveling at speeds faster than the above-mentioned predetermined low value. At any speed slower than this value, the wheelslip correction value is decreased at a predetermined minimum rate (e.g., corresponding to 0.75 volts per second at the power source); therefore power will be restored at a rate that varies with speed, while motor current (and hence tractive or braking effort) increases at a desired, substantially constant rate. Note, however, that at relatively low vehicle speeds the current limit mode of operation of the propulsion system will normally determine the amount of traction power in any event.

In a different aspect of the invention, performance of the wheelslip control means is improved by providing fourth means for respectively deriving the rates of change of rotational speeds of the separately driven wheels of the vehicle, fifth means for comparing these rates and for providing a rate value representative of the highest rate of change, bistable "rate trip" means operative from a reset state to a set state in response to the rate value increasing to at least a predetermined pickup level, and additional means effective when the rate trip means is set for supplying a variable value that depends on either the rate value or the aforesaid feedback value or the product of the two. Second summing means is provided for combining the variable value and the integrator output so that the aforesaid wheelslip correction value will actually vary with their sum. Consequently the correction value will abruptly increase whenever the highest rate attains the pickup level of the rate trip means, and the size of the increment increases as the rate value and/or the feedback value (e.g., motor voltage) increase. The aforesaid pickup level is relatively low so that the rate trip means will effectively respond to incipient wheelslip conditions when the wheel-surface adhesion of the vehicle is low, as indicated by relatively low total motor current. However, at higher levels of adhesion this pickup level could be so sensitive as to cause spurious derations. Accordingly, in an optional feature of the invention the pickup level tracks the adhesion level as the latter varies between predetermined values, whereby the rate at which the rate trip means becomes effective is smaller at relatively low adhesion levels (e.g., 1 mph per second at an adhesion level of 10%) than at higher adhesion levels (e.g., 3 mph per second at 15% adhesion).

In another aspect of the invention, responsiveness to relatively large speed error values is improved by providing means operative if the speed error exceeds a predetermined level for obtaining a "proportional" value related to the voltage error value by a coefficient that increases from zero as the speed error increases above the predetermined level, and the proportional value is also supplied to the second summing means where it is added to the wheelslip correction value.

In a significant aspect of the invention, the means for reducing the aforesaid reference signal value comprises memory means effective while the wheelslip correction value is greater than zero for saving a value approximately the same as the reference value at the moment of time when either the speed error value becomes positive or the rate trip means becomes effective. So long as the memory means is effective, the reference signal value is reduced to a level equal to the saved value minus the wheelslip correction value regardless of the power setting of the throttle. In this manner the degree of reference signal correction (i.e., the amount of traction power reduction or deration) during a wheelslip condition is referenced to the control system parameters as existing at the time when the wheelslip condition was first detected, and once this condition is cured and the wheelslip correction value resets to zero, the reference signal value is returned to its former value. This promotes a smooth and stable transition from wheelslip control to normal control of the propulsion system. Assuming that the vehicle did not gain speed during the wheelslip condition in motoring (or did not lose speed during the wheelslip condition in braking), the propulsion control system can resume normal operation without resetting any of its various reference values.

The wheelslip control means includes means for detecting the number of separately driven wheels of the vehicle that are slipping, as indicated by excessively high derivatives of the rates of change of rotational speeds derived by the aforesaid fourth means. In another aspect of the invention, the aforesaid second means is so arranged that the reference speed value normally varies with the rotational speed of a wheel that is not slipping (the slowest wheel during motoring or the fastest wheel during braking) but will not change appreciably whenever the number of slipping wheels equals or exceeds a predetermined limit (e.g., 8 wheels in a 12-wheel, 6-axle locomotive). As a result, the reference speed will not deviate greatly from a value corresponding to the vehicle speed if most or all of the wheels are slipping, as would be true if a synchronous slip were to occur. After the number of slipping wheels attains this limit, any deviation caused by vehicle speed actually increasing in motoring (or decreasing in braking) is soon corrected, because the aforesaid speed error value will then increase in a positive direction due to the increasing highest speed (or decreasing lowest speed in braking) and the integrator consequently increases the wheelslip correction value which will derate traction power so as to reduce the number of slipping wheels below the limit, whereupon the second means will again be able to raise (or lower) the reference speed, if and as necessary, to a value corresponding to the new speed of the vehicle.

In yet another aspect of the invention, a synchronous slip condition is avoided by providing means for changing the desired value of the highest (or lowest) wheel speed by a variable amount that increases from zero with the length of time that the number of slipping wheels is above the aforesaid predetermined limit, such change tending to increase the speed error value in a positive direction. Preferably the variable amount increases at a rate that varies with the maximum difference speed determined by the aforesaid third means and has an upper limit that is at least approximately twice the maximum difference speed, whereby the speed error value will increase more rapidly at relatively high track speeds than at lower speeds. As a result, as soon as the number of slipping wheels exceeds the aforesaid limit, the speed error value is boosted to a value that soon exceeds the aforesaid predetermined level at which the means for obtaining the proportional value is operative, and the wheelslip correction value is quickly and sufficiently increased to derate traction power before all of the remaining non-slipping wheels begin to slip. In other words, the desired-value changing means of the wheelslip control means is effective to keep at least one of the vehicle's axle-wheel sets not slipping.

Preferably the wheelslip control means also includes means associated with the aforesaid fourth means for detecting the lowest one of the rates of change of wheel speed, and second bistable means operative from a reset to a set state in response to the lowest rate increasing to at least the aforesaid pickup level. The previously mentioned second means is so arranged that the reference speed value will not change appreciably if the second bistable means is set, as would be true if all of the powered wheels were changing speeds at excessively high rates, and the desired-value changing means is so arranged as to increase the speed error value by a variable amount that increases from zero with the length of time that the second bistable means is in its set state. With this arrangement the desired deration can be alternatively initiated either by the second bistable means changing to its set state in response to a relatively rapid onset of a synchronous slip condition or by the number of slipping wheels becoming excessively large in response to such a condition developing more gradually.

The invention will be better understood and its many objectives and advantages will be more fully appreciated from the following description taken in conjunction with the accompanying drawings.

BRIEF DESCRIPTION OF THE DRAWINGS

FIG. 7 is a flow chart that explains the presently preferred manner of generating the reference speed value and the synchronous slip timing function that are utilized in other components of the wheelslip control shown in FIG. 5;

FIG. 10–12 are flow charts that explain the preferred manner of implementing the integrating, proportional and rate functions shown schematically in FIGS. 8 and 9, with FIG. 11 illustrating the deration subroutine and FIG. 12 illustrating the recovery subroutine;

DETAILED DESCRIPTION OF THE INVENTION

Figure 1:
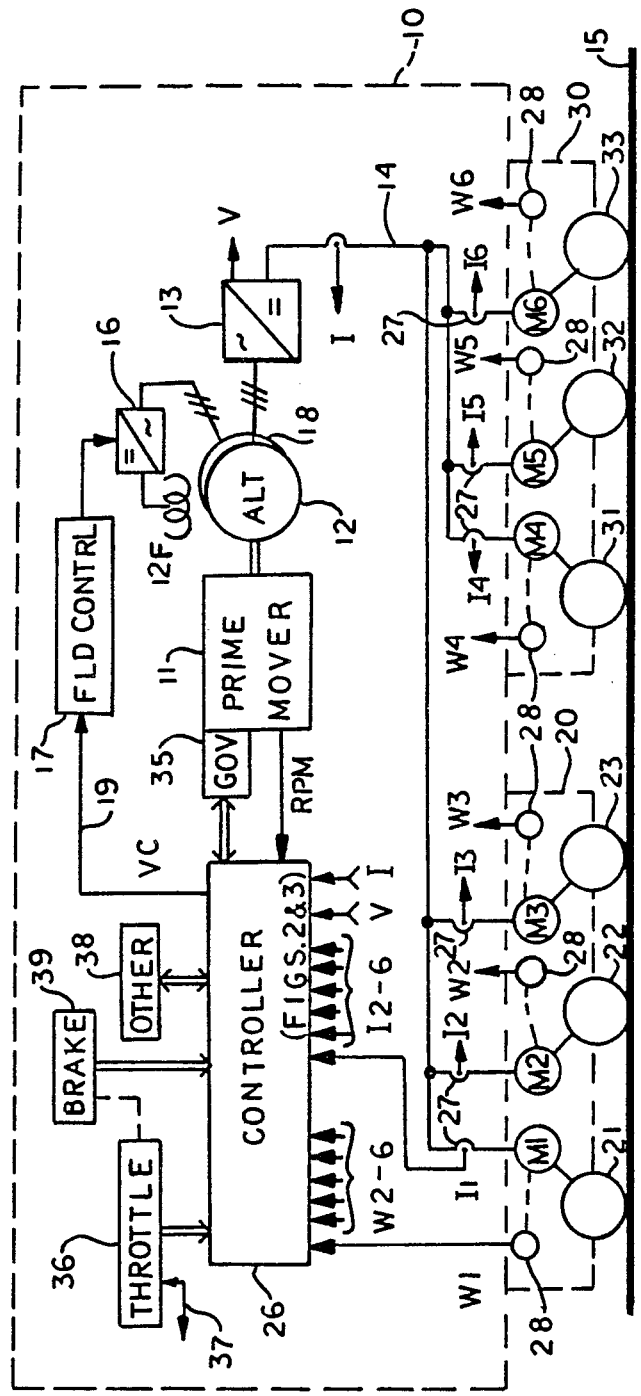
FIG. 1 is a schematic diagram of the principal components of a propulsion system for a 6-axle locomotive including a thermal prime mover (such as a diesel engine), a traction alternator, a plurality of traction motors and their respectively associated speed sensors, and a controller.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The 3-phase voltages generated by the main alternator 12 are applied to a-c input terminals of at least one 3-phase, double-way uncontrolled power rectifier bridge 13. The direct current (d-c) output of the bridge 13 is electrically coupled, via a d-c bus 14, in energizing relationship to a plurality of adjustable speed d-c traction motors M1 through M6. Prime mover 11, alternator 12, and rectifier bridge 13 are suitably mounted on the platform of a self-propelled traction vehicle 10 which typically is a 6-axle diesel-electric locomotive. The locomotive platform is in turn supported on two trucks 20 and 30, the first truck 20 having three axle-wheel sets 21, 22 and 23 and the other truck 30 also having three axle-wheel sets 31, 32 and 33.

Each axle-wheel set of the locomotive comprises a pair of flanged wheels affixed to opposite ends of an axle. All six pairs of wheels travel on a surface provided by a pair of parallel, spaced-apart rails, one of which is illustrated by the line 15 in FIG. 1. Each of the traction motors M1–M6 is hung on a separate axle, and its armature is mechanically coupled, via conventional gearing (not shown), in driving relationship to the associated axle-wheel set. During the motoring or propulsion mode of operation, the field windings of the traction motors M1–M6 are connected in series with the respective armature windings thereof, and the six motors are electrically connected in parallel with one another.

Suitable current transducers 27 are used to provide a family of six current feedback signals I1 through I6 that are respectively representative of the magnitudes of motor armature current, and suitable speed sensors 28 are used to provide a family of six speed feedback signals W1 through W6 that are respectively representative of the rotational speeds (revolutions per minute, or "rpm") of the motor shafts and hence of the separately driven axle-wheel sets.

Figure 3:
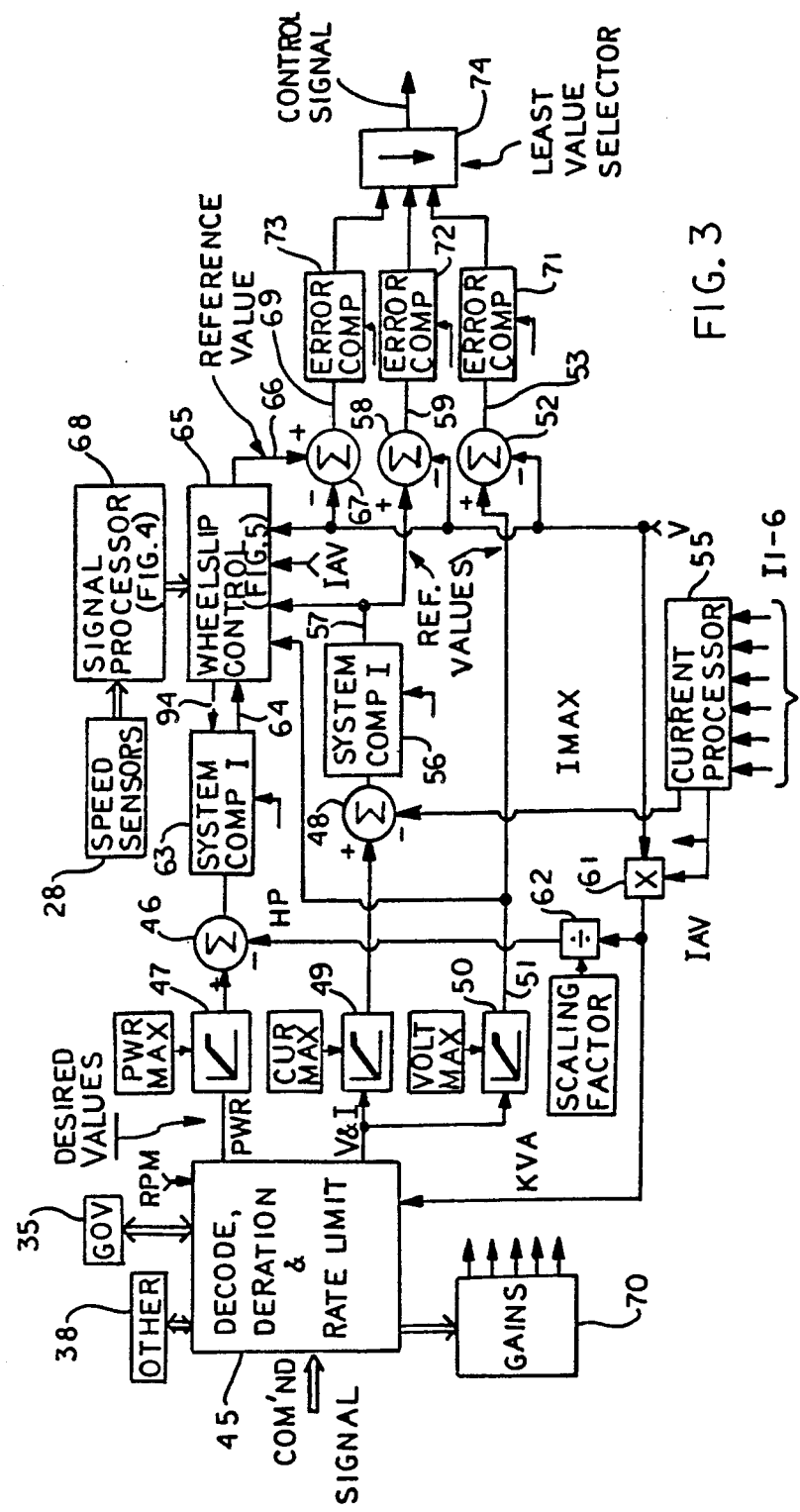
FIG. 3 is a diagram of an "equivalent circuit" that is used to illustrate the manner in which the alternator field excitation control signal is produced by the controller shown in FIG. 2.

The main alternator 12 and the rectifier bridge 13 serve as a controllable source of electric power for the respective traction motors. The magnitude of output voltage (or current) of this source is determined and varied by the amount of excitation current supplied to field windings 12F on the rotor of the main alternator. The alternator field excitation current is supplied by a 3-phase controlled rectifier bridge 16 the input terminals of which receive alternating voltages from a prime mover-driven auxiliary alternator 18 that can actually comprise an auxiliary set of 3-phase windings on the same frame as the main alternator 12. Conventional control or regulating means 17 is provided for varying the magnitude of direct current that the controlled rectifier bridge 16 supplies to the alternator field (and hence the output of the alternator 12) in accordance with a variable control signal VC on an input line 19. The control signal VC is provided by a controller 26 which, as will be more fully explained when FIG. 3 is described hereinafter, is operative to vary VC as necessary to minimize any difference between a reference signal (the value of which normally depends on the value of a variable command signal) and a feedback signal representative of the actual value of the quantity being regulated. The system includes suitable means for deriving a voltage feedback signal V representative of the average magnitude of the rectified output voltage of the main alternator, which magnitude is a known function of the field current magnitude and also varies with the speed of the prime mover 11.

The prime mover 11 is a thermal or internal-combustion engine or equivalent. On a diesel-electric locomotive, the motive power is typically provided by a high-horsepower, turbocharged, 16-cylinder diesel engine. Such an engine has a fuel system (not shown) that includes a pair of fuel pump racks for controlling how much fuel oil flows into each cylinder each time an associated fuel injector is actuated by a corresponding fuel cam on the engine crankshafts. The position of each fuel rack, and hence the quantity of fuel supplied to the engine, is controlled by an output piston of an engine speed governor 35. The governor regulates engine speed by automatically displacing the racks, within predetermined limits, in a direction and by an amount that minimizes any difference between actual and desired speeds of the engine crankshaft. The desired speed is set by a variable speed call signal received from the controller 26.

In a normal motoring or propulsion mode of operation, the value of the engine speed call signal is determined by the position of a handle of a manually operated throttle 36 to which the controller 26 is coupled. A locomotive throttle conventionally has eight power positions or notches (N), plus idle and shutdown. N1 corresponds to a minimum desired engine speed (power), while N8 corresponds to maximum speed and full power. In a consist of two or more locomotives, only the lead unit is usually attended, and the controller onboard each trail unit will receive, over a trainline 37, an encoded signal that indicates the throttle position selected by the operator in the lead unit.

For each power level of the engine there is a corresponding desired load. The controller 26 is suitably arranged to translate the throttle notch information into a reference signal value substantially equal to the value that the voltage feedback signal V will have when the traction power matches the called-for power, and so long as the alternator output voltage and load current are both within predetermined limits the control signal VC on the input line 19 of the field controller 17 is varied as necessary to obtain this desired load. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

As is illustrated in FIG. 1, the controller 26 receives voltage feedback signal V, current feedback signals I1–I6, axle/wheel speed feedback signals W1–W6, another current feedback signal I representative of the magnitude of the rectified output current of the main alternator 12, an engine speed signal RPM indicating the rotational speed of the engine crankshaft, a load control signal issued by the governor 35 if the engine cannot develop the power demanded and still maintain the called-for speed, and relevant data from other selected inputs 38. (The load control signal is effective, when issued, to reduce the value of the reference signal in the controller 26 so as to weaken the alternator field until a new balance point is reached.)

In an electrical braking or retarding mode of operation, inertia of the moving vehicle is converted into electrical energy by utilizing the traction motors as generators. To configure the propulsion system for braking, the throttle handle is moved to its idle position, an interlocking handle of a brake control device 39 is moved from an off position, through a set-up position, to various on positions, and the armature windings of the traction motors M1–M6 are disconnected from the motor field windings and reconnected to an appropriate load circuit which, in the case of dynamic braking, typically comprises an array of fan-blown resistor grids (not shown) where electrical energy generated by the motors is dissipated in the form of heat. The motor field windings are now separately excited by the rectified output current of the main alternator 12, and the controller 26 is operative to vary the alternator field excitation so that at relatively high track speeds (e.g., higher than approximately 20 mph) the average magnitude of motor current supplied to the resistor grids (and hence braking effort) is regulated to a reference value that depends on the setting of the brake handle, whereas at lower track speeds, whenever maximum rated current is reached in the motor field windings, the alternator output current is held constant at this limit and braking current will decrease linearly with speed.

Figure 2:
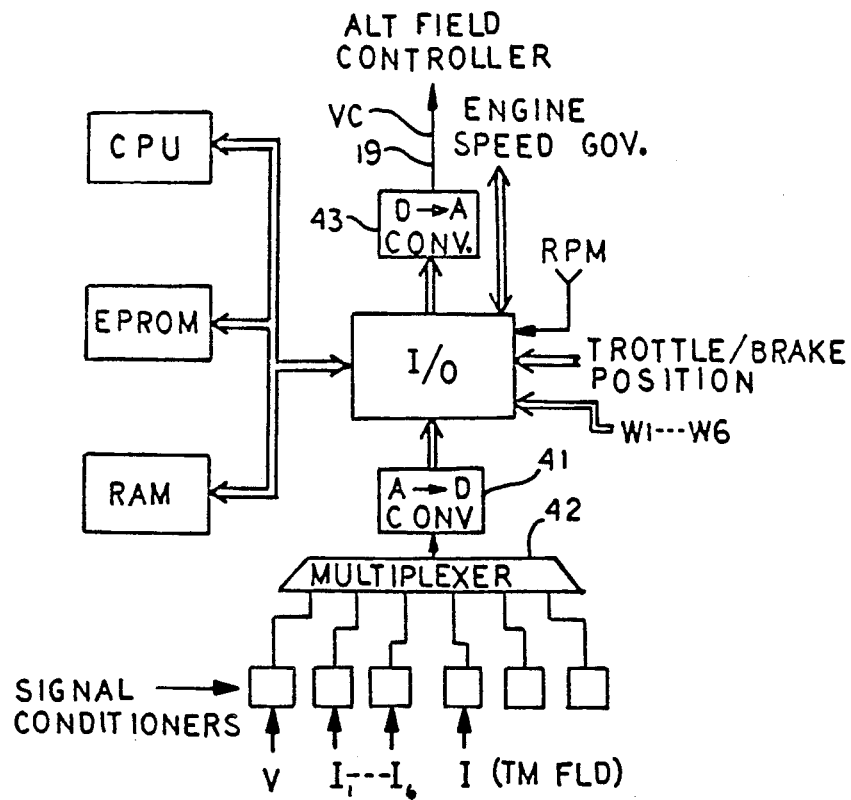
FIG. 2 is an expanded block diagram of the controller (shown as a single block in FIG. 1) which produces an output signal for controlling the field excitation of the traction alternator.

In the presently preferred embodiment of the invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, which is illustrated in FIG. 2, a central processing unit (CPU) executes an operating program stored in an erasable and electrically reprogrammable read only memory (EPROM) which also stores tables and data utilized in the program. Contained within the CPU are conventional counters, registers, accumulators, flipflops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The other blocks shown in FIG. 2 represent conventional peripheral and interface components that interconnect the microcomputer and the external circuits of FIG. 1. More particularly, the block labeled "I/O" is an input/output circuit for supplying the microcomputer with data representative of the selected throttle (or brake) position and with digital signals representative of the readings of various voltage, current and other sensors associated with the locomotive propulsion system. The latter signals are derived from an analog-to-digital converter 41 connected via a conventional multiplexer 42 to a plurality of signal conditioners to which the sensor outputs are respectively applied. The signal conditioners serve the conventional dual purposes of buffering and biasing the analog sensor output signals. As is indicated in FIG. 2, the input/output circuit also interconnects the microcomputer with the engine speed governor, the engine speed sensor, the axle/wheel speed sensors, and a digital-to-analog signal converter 43 whose output VC is connected via the line 19 to the alternator field controller.

The controller 26 is programmed to produce, in the motoring mode of operation, a control signal having a value that varies as necessary to zero any error between the value of the alternator voltage feedback signal V and the value of a reference signal that normally depends on the throttle position selected by the locomotive operator and the traction power output of the main alternator. The manner in which this is accomplished is functionally illustrated in FIG. 3. In addition, in order to implement an electrical braking mode of operation, the controller can be programmed to vary the value of the control signal as necessary to zero any error between the value of the motor armature current feedback signal (i.e., the average magnitude of the six current feedback signals I1-I6) and the value of a reference signal that normally depends on the dynamic brake position selected by the locomotive operator.

The throttle position data that the controller 26 receives in motoring is hereinafter referred to as a variable command signal; it is fed, as is shown in FIG. 3, to a block 45 that represents suitable means for performing decoding, deration, and rate limit functions. Preferably these functions are carried out in the manner disclosed in U.S. Pat. No. 4,634,887-Balch et al, issued Jan. 6, 1987, and assigned to General Electric Company, which disclosure is expressly incorporated herein by reference. The block 45 has first and second output channels, labeled "PWR" and "V&I," respectively. A number representing a desired value of traction power output of the main alternator per powered axle of the locomotive is provided on the first channel, and a number representing a desired value of the voltage (and current) limit is provided on the second channel. Under normal, steady state operating conditions, such desired values are determined by the value of the command signal. But when more power is called for, the rate limit function in the block 45 will cause the desired data to change at a controlled rate which is a function of the actual speed and horsepower of the engine.

As can be seen in FIG. 3, the desired power value on the first output channel of the block 45 is supplied as one input to first summing means 46 via a block 47 whose function is to impose a preset maximum limit on the desired power value. The datum representing the desired voltage (and current) limit on the second output channel is supplied as one input to second summing means 48 via a block 49 whose function is to establish an absolute maximum limit for the alternator output current, and the same datum is also deployed as a voltage limit reference value which is separately supplied, via a block 50 and a line 51, as one input to third summing means 52. The function of the block 50 is to establish an absolute maximum limit for the alternator output voltage. The third summing means 52 has another input which is the value of the voltage feedback signal V. The latter value represents the average magnitude of the rectified output voltage of the main alternator, and the third summing means derives, on a line 53, a voltage error value representing the amount that this magnitude is under the desired voltage limit.

The second summing means 48 has another input which is the value of a current feedback signal IMAX derived from a current processor 55 to which the six current feedback signals I1-I6 are supplied. The processor 55 is so constructed and arranged that IMAX is determined by whichever one of the individual current feedback signals is largest, and therefore the value of IMAX corresponds to the highest magnitude of motor current. The second summing means 48 derives a difference value representing the amount that the highest current magnitude is under the desired current limit. This difference value is processed in accordance with a programmed system compensation routine 56 ("System Comp I") to derive a current limit reference value that is supplied on a line 57 as one input to fourth summing means 58. The fourth summing means has another input which is the value of the voltage feedback signal V, and it derives, on a line 59, a current error value equal to the reference value on the line 57 minus the value of V.

As is shown in FIG. 3, the first summing means 46 has another input which is the value of a power feedback signal HP proportional to the product of the main alternator output voltage and the traction motor current. To obtain the power feedback value, the value of the voltage feedback signal V is multiplied, in a block 61, by the value of a current feedback signal IAV which is derived in the current processor 55 and which is representative of the total motor current divided by six. The resulting signal KVA is representative of the kilowatts of traction power, and it is divided, in a block 62, by a scaling factor to provide the power feedback signal HP corresponding to traction horsepower per powered axle. The first summing means 46 derives a difference value representing the amount (if any) that the actual traction power is less than desired. This difference value is processed in accordance with another programmed system compensation routine 63 to derive a power reference signal that is supplied, via a line 64, a wheelslip control function 65, and another line 66, as one input to fifth summing means 67. Associated with the wheelslip control function 65 is a signal processor 68 coupled to the six individual axle/wheel speed sensors 28. In a manner that will be fully explained hereinafter, the signal processor 68 and the wheelslip control function 65 are operative in response to incipient or actual wheelslip conditions to override the throttle-dependent reference signal on the line 64 and reduce the power reference value on the line 66, thereby derating traction power in order to restore wheel-rail adhesion.

The fifth summing means 67 has another input which is the value of the voltage feedback signal V, and it derives, on a line 69, a power error value equal to the reference value on the line 66 minus the value of V. The voltage, current, and power error values on the lines 53, 59 and 69 are respectively processed by programmed error compensation routines 71, 72, and 73 ("Error Comp") to derive voltage, current, and power control values. The error compensation routines 71-73, as well as the system compensation routines 56 and 63, introduce proportional-plus-integral transfer functions the respective gains of which are functions of the throttle position and other parameters of the locomotive and its controls, as determined in a gains function 70. Thus each of the compensated control values varies as a function of the time integral of its associated error value. All three of the control values are supplied as inputs to a least value gate 74, and the value of the control signal at the output of the gate 74 is the smallest of these input values. The resulting control signal determines the magnitude of the analog control signal VC that the controller 26 applies, via the line 19, to the alternator field controller 17 (FIG. 1).

The field controller 17 will respond to the control signal value by varying the field strength of the traction alternator 12 as necessary to minimize whichever one of the error values on the lines 53, 59, and 69 is producing the smallest input value to the least value gate 74. So long as both V and IMAX are within the limits set by the common V & I output of the block 45 and are not above their respective maximum limits as established at blocks 50 and 49, the control signal value is determined by the power control value which will now be smaller than either the voltage or current control value. Consequently, the alternator output voltage is maintained at whatever level results in the value of V equalling the power reference value which normally is the same as the value that the system compensation routine 63 establishes on the line 64 when there is no error between the sensed magnitude of traction power and the desired magnitude thereof. But if V (or IMAX) tends to exceed its limit, the voltage (or current) control value is driven lower than the power control value and the control signal value accordingly decreases, whereby the alternator voltage is adjusted to whatever level results in essentially zero error between V (or IMAX) and the voltage (or current) limit reference value.

As was explained earlier, FIG. 3 shows the manner of controlling the motoring operation of the locomotive propulsion system. Alternatively, the same controller can control the electrical braking or retarding operation of the propulsion system. In the latter case, the variable command signal would be the brake handle position data, the value on the first output channel of the block 45 would represent the desired value of brake current (i.e., the magnitude of current in the resistor grids per powered axle), the feedback signal for the first summing means 46 would be the motor armature current feedback signal IAV, and the feedback signal for the third, fourth and fifth summing means would be the alternator output current feedback signal I (i.e., the magnitude of current in the traction motor field windings).

Figure 4:
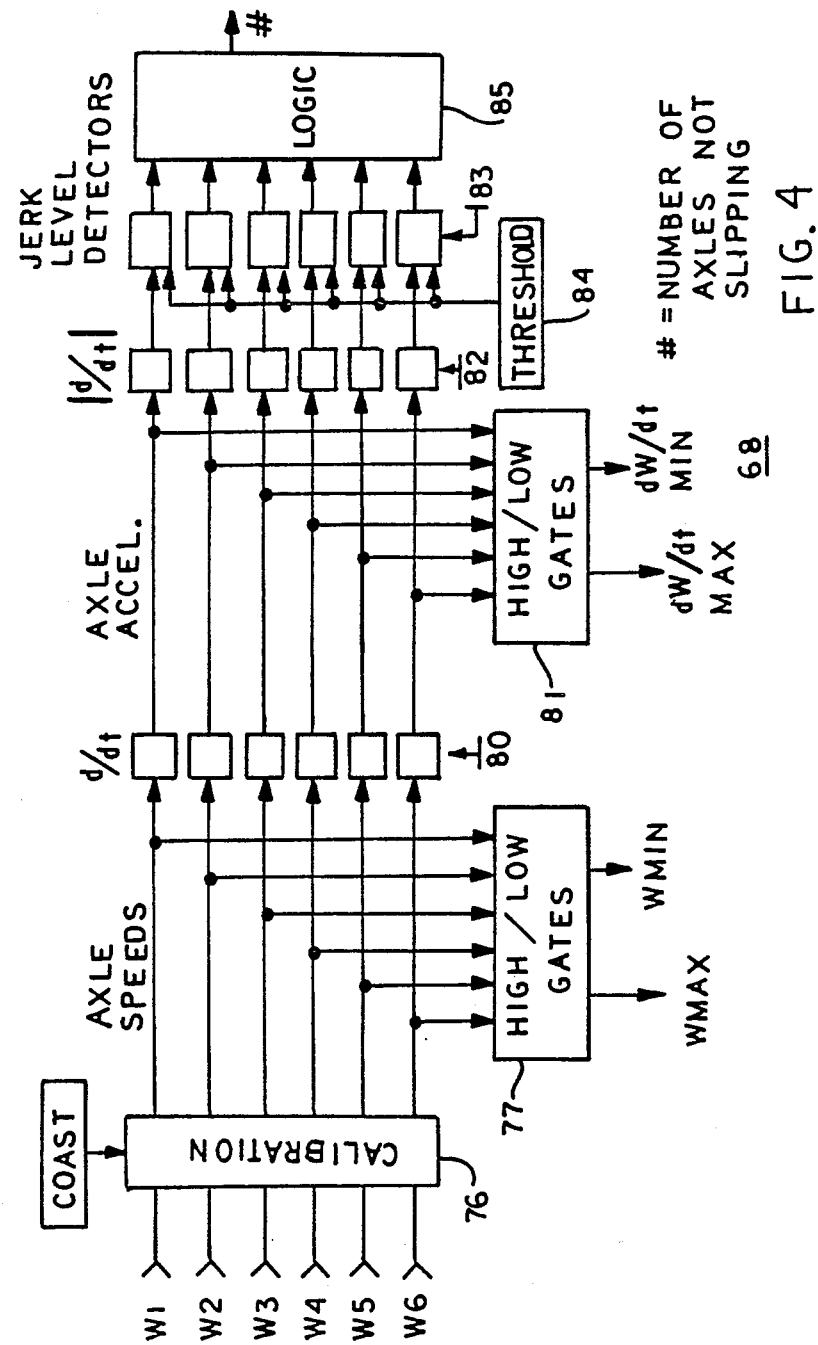
FIG. 4 is an expanded block diagram of the signal processor (shown as a single block in FIG. 3) to which the speed sensors of FIG. 1 are coupled.
Figure 5:
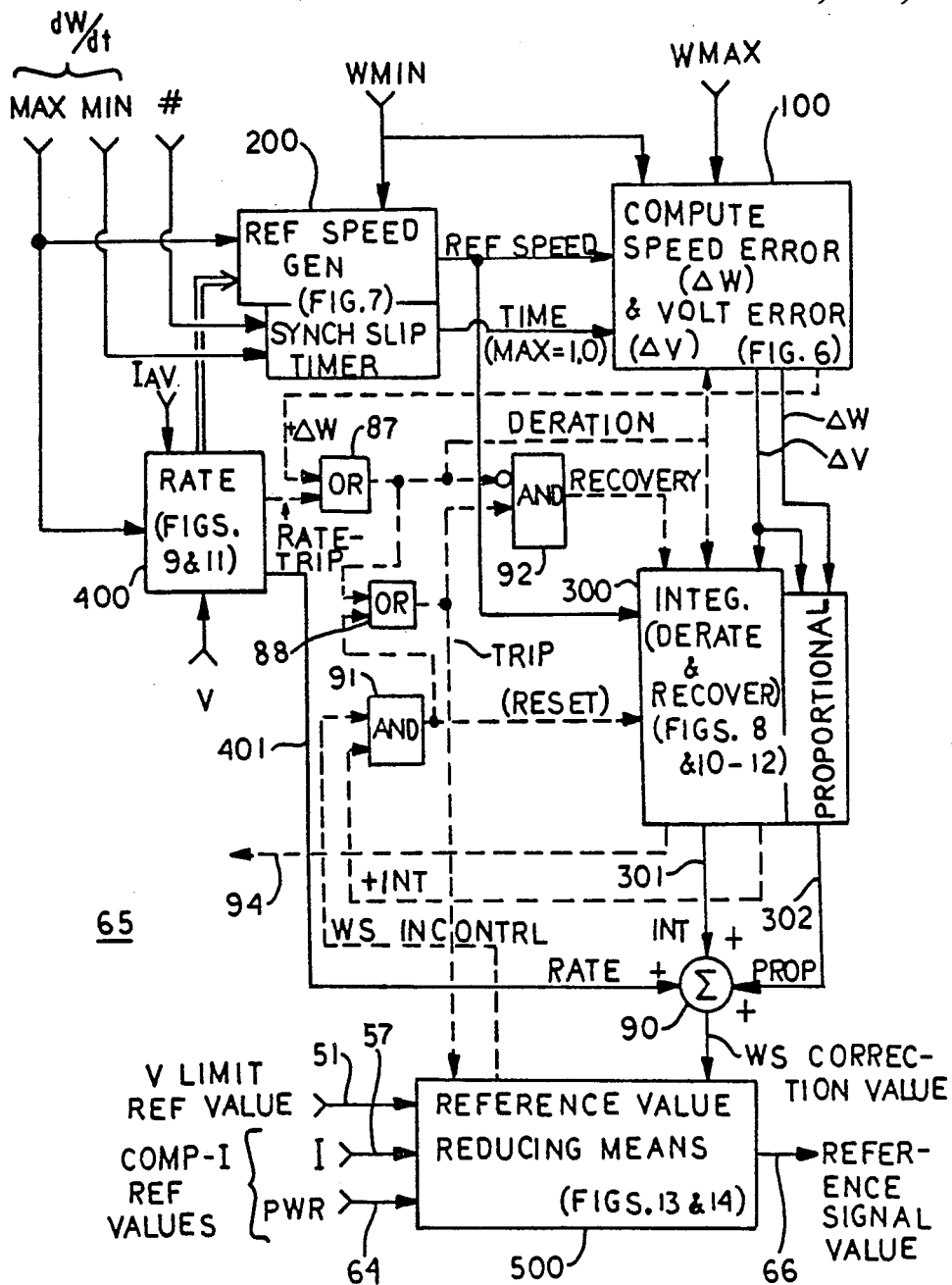
FIG. 5 is an expanded block diagram of the principal components of the wheelslip control means shown as a single block in FIG. 3.

The speed signal processor 68 and the wheelslip control function 65, comprising the wheelslip control means of the present invention, are illustrated in more detail in FIGS. 4 and 5, respectively. As is shown functionally in FIG. 4, the speed feedback signals W1-W6 are fed to a suitable calibration function 76 which scales each of these rotational speed signals to the corresponding peripheral speed value (miles per hour, or "mph") of the associated axle-wheel set and which from time to time adjusts these values as necessary to ensure that all six of them are substantially equal to one another when the locomotive is coasting (i.e., when the traction motors M1-M6 are deenergized and track speed exceeds 8 mph) despite unequal wheel diameters. The calibrated speed feedback signals are in turn fed to suitable means 77 for comparing their values and for detecting the highest and lowest values, respectively. The latter means 77 has two output values: one is labeled "WMAX" and varies with the highest speed detected, and the other is labeled "WMIN" and varies with the lowest speed detected.

The six calibrated speed feedback signals from the calibration function 76 are also fed to suitable first differentiating means 80 for deriving six rate of change of speed values. Rate values that have a positive sign are representative of the acceleration (mph per second) of the respectively associated axle-wheel sets, whereas relatively negative rate values are representative of the deceleration (mph per second) of the respectively associated axle-wheel sets. All six rate values are in turn supplied to suitable means 81 for comparing them and for detecting the highest and lowest values, respectively. The latter means 81 has two output values: one is labeled "dW/dtMAX" and varies with the highest rate of change of speed, and the other is labeled "dW/dtMIN" and varies with the lowest rate of change of speed.

The six individual rate values derived by the first differentiating means 80 are also supplied to suitable second differentiating means 82 for deriving six absolute values, herein called "jerk" values. These jerk values are derivatives of the respective rate values and therefore are second derivatives of the calibrated speed feedback values. In other words, each jerk value is representative of the rate of change of acceleration (or deceleration)—expressed in units of mph per second per second—of the associated axle-wheel set. As is shown in FIG. 4, the jerk values are supplied to the inputs of six bistable level detecting means 83 where they are respectively compared with a preselected threshold level provided by a block 84.

The output state of each of the level detectors 83 is determined by whether or not the associated jerk value exceeds the preselected threshold level which preferably is slightly above the maximum rate of change of acceleration (or deceleration) expected during normal speed changes of the locomotive with good wheel-rail adhesion. In one practical application of the invention, the threshold level is 0.75 mph/sec$^2$; if any jerk value exceeds this level the associated axle-wheel set is assumed to be spinning or skidding. The level detector outputs are monitored by logic means 85 for detecting the number of separately driven axle-wheel sets that are slipping, as indicated by the output state of each level detector when the associated jerk value is excessively high. Preferably, the logic means 85 is so arranged that its output count (labeled "#") equals the number of axle-wheel sets that are *not* slipping, as indicated by jerk values not exceeding the aforesaid threshold level. In practice the processor 68 also includes appropriate low-pass filtering means (not shown) for suitably conditioning the input and/or output values of various components thereof.

As is shown functionally in FIG. 5, the highest and lowest speed values, the highest and lowest rate values, and the non-slipping axle count from the above-described speed signal processor 68 are fed to the wheelslip control function 65, along with the voltage feedback value (V), the average current value (IAV) derived from the current processor 55, the power reference value derived from the system compensation block 63, the current limit reference value derived from the system compensation block 56, and the voltage limit reference value on the line 51. The wheelslip control function 65 comprises five coordinated subsystems plus a plurality of collateral logic steps for initiating the alternative deration and recovery modes of wheelslip operation. In describing the presently preferred embodiment of the subsystems and logic steps of the wheelslip control function, it will be assumed that either constant or increasing traction power is being called for by the command signal. As will be apparent to persons skilled in the art, by suitably interchanging certain of the illustrated inputs and/or their polarities the invention would also be useful, if desired, to control wheelslip during electrical braking.

Figure 6:
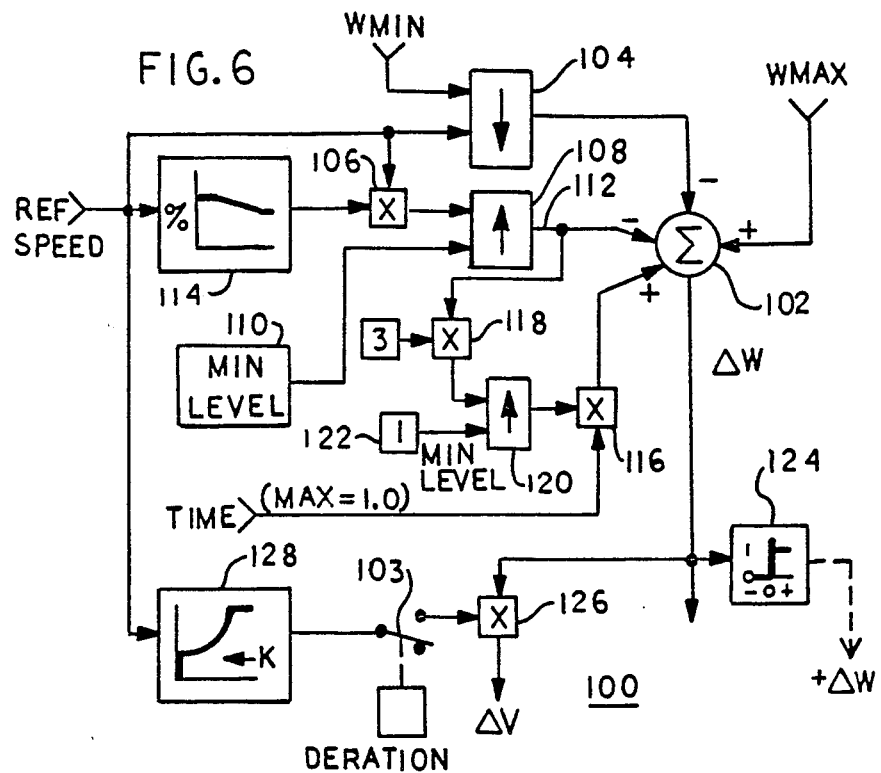
FIG. 6 is a functional block diagram of the means for computing the values of the speed and voltage errors in the FIG. 5 wheelslip control.

In the first subsystem 100 of the wheelslip control function 65, a speed error value (DeltaW) and a voltage error value (DeltaV) are computed from the known highest speed value (WMAX) and a reference speed value generated by the second subsystem 200. The reference speed value is indicative of the rotational speed of a locomotive axle-wheel set that is not slipping, and it is therefore a true measure of the track speed of the locomotive (except under a synchronous wheelslip condition). As will soon be explained when FIG. 6 is described, the speed error value is representative of the algebraic sum of the highest axle-wheel speed, the reference speed, and a predetermined normally desired maximum difference speed. If the highest speed has a desired value, the speed errorvalue is zero. Whenever the highest speed has an actual value greater than desired, the speed error value is positive. Upon detecting a positive speed error (+DeltaW), the first subsystem 100 causes an OR logic step 87 to have a high output state that in turn activates a deration or power reducing mode of operation of the wheelslip control function. As is illustrated functionally in FIG. 5, the output of a second OR logic step 88 will be in a high or "TRIP" state concurrently with the high state of the step 87.

In the deration mode of operation, the first subsystem 100 is operative to derive a voltage error value related to the speed error value by a variable gain that is a predetermined function of the reference speed value. The voltage error value is then integrated in the third subsystem 300 of the wheelslip control function 65. This produces a variable value "INT" that is representative of the time integral of the voltage error value, increasing in a positive sense at an average rate that varies with the voltage error value. Consequently, the INT value increases at a rate that is a desired function of the speed error value. It is fed via a first output line 301 of the subsystem 300 to summing means 90. So long as INT is positive (+INT), the subsystem 300 activates one input of an AND logic step 91.

If and when the speed error value is positive and exceeds a predetermined level, the third subsystem 300 is operative to produce a second variable value "PROP" proportional to the voltage error value. The PROP value is fed via another output line 302 to the summing means 90 which derives a wheelslip correction value that varies with the sum of the INT value, the PROP value, and a third variable value "RATE." The latter value is fed to the summing means via a line 401 from the fourth subsystem 400 whenever the highest rate (dW/dtMAX) equals or exceeds a predetermined pickup level, and it will raise the wheelslip correction value by an amount that varies with the product of the highest rate value and the value of the voltage feedback signal V. If desired, the pickup level can be a function of the wheel-rail adhesion of the locomotive, as indicated by the average value (IAV) of motor current; for example, the pickup level could vary from one mph per second at an adhesion level of 10% to three mph per second at 15% adhesion. Once the highest rate attains the pickup level, a RATE TRIP is indicated and the subsystem 400 causes the logic step 87 to activate the deration mode of operation of the wheelslip control function. At the same time the logic step 88 is in its TRIP state.

Figure 13:
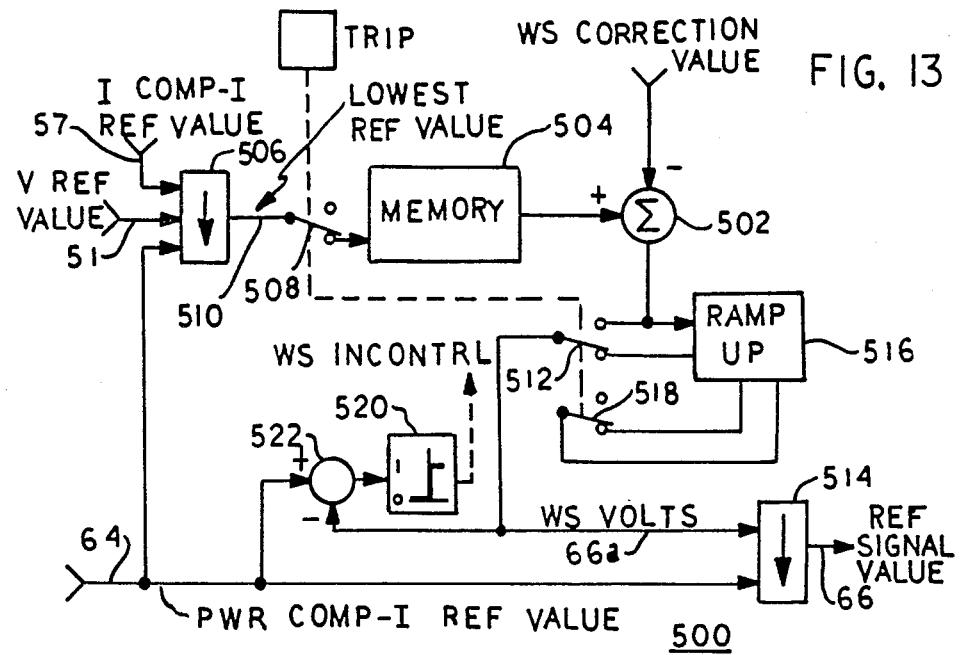
FIG. 13 is an expanded block diagram of a simplified version of the power reference value reducing means shown as a single block in FIG. 5.
Figure 14:
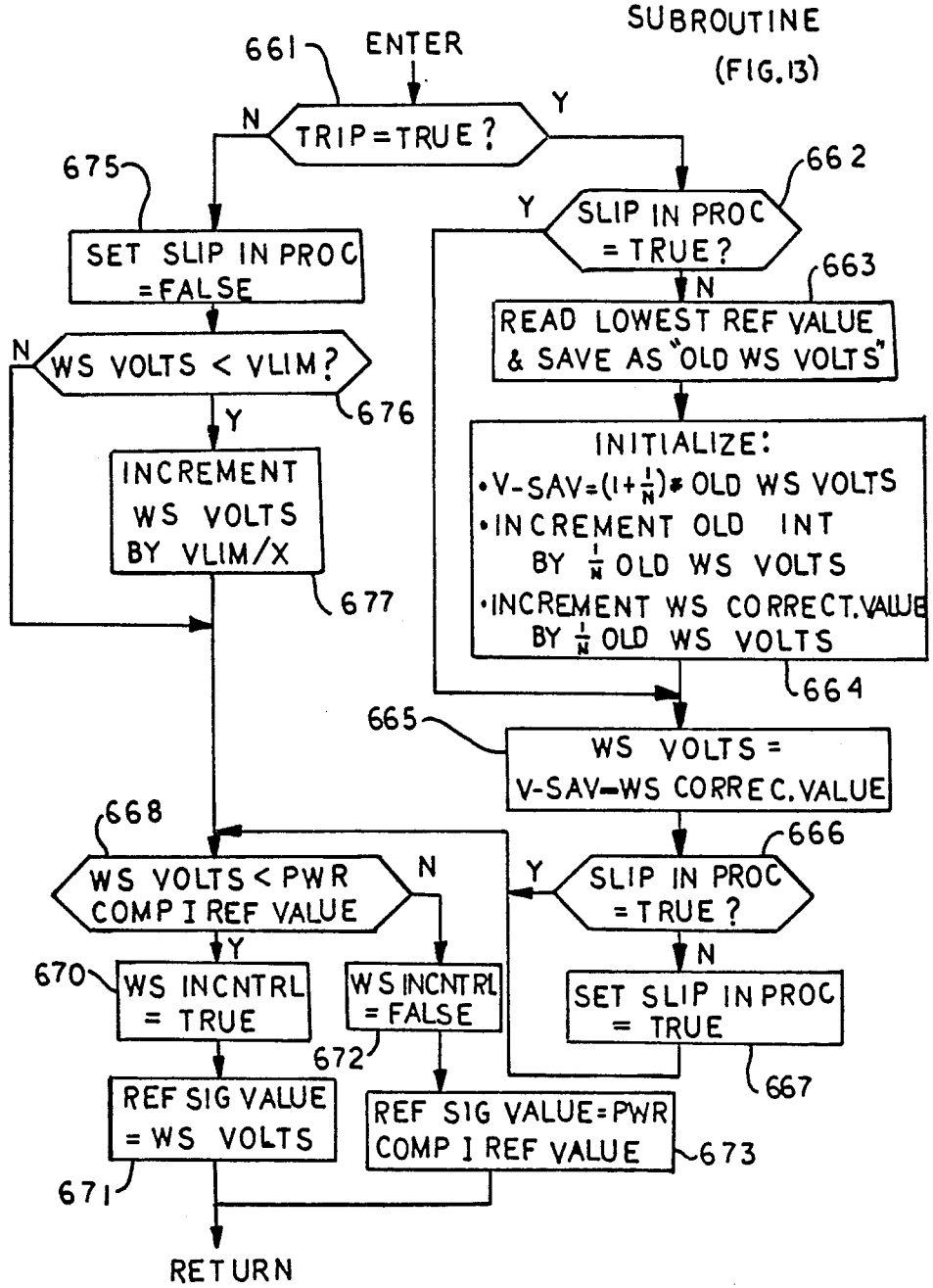
FIG. 14 is a flow chart explaining the preferred manner of implementing the reference value reduction function shown schematically in FIG. 13.

The wheelslip correction value derived by the summing means 90 is an input to the fifth subsystem 500 of the wheelslip control function. Whenever the logic step 88 is in its TRIP state, the latter subsystem is operative to override the throttle-dependent power reference signal received on its input line 64. In operation, as will be explained below when FIGS. 13 and 14 are described, this subsystem will reduce the value of the power reference signal on its output line 66 by an amount equal to the correction value. So long as the reduced reference value on line 66 is lower than the power reference value on the line 64, the wheelslip control function 65 is in fact in control (WS INCONTRL) and the subsystem 500 activates the other input of the AND logic step 91. Only if both of its inputs are concurrently activated (i.e., WS INCONTRL and +INT coexist), the step 91 will have a high output state.

As is illustrated functionally in FIG. 5, the logic step 88 will be in its TRIP state concurrently with the high output state of the logic step 91. An additional logic step 92 is associated with the two logic steps 87 and 88; it has a high output state that activates a recovery or power restoring mode of operation of the wheelslip control function 65 whenever the output of step 87 is not high (i.e., the highest speed is not greater than desired and the deration mode has terminated) while the step 88 is in its TRIP state (i.e., the INT value is positive and hence the wheelslip correction value is greater than zero, and the wheelslip control function is in control). In the recovery mode of operation, the third subsystem 300 is effective to decrease the INT value, and hence the wheelslip correction value, at an average rate that is independent of the speed error value and that preferably varies as a predetermined function of the reference speed. As soon as the INT value is returned to zero, both of the logic steps 91 and 88 are deactivated and thus change from high to low states. Now the wheelslip correction value is zero and the recovery mode of operation is terminated. At the same time, via broken line 94, the third subsystem 300 re-initializes the values of the system compensation represented by the block 63 in FIG. 3. After the recovery mode terminates, the wheelslip correction value derived by the summing means 90 will remain equal to zero, the power reference value on the line 66 will be the same as the value on the line 64, and the propulsion control system can operate in its normal motoring mode unless and until another deration mode is initiated by the concurrent low-to-high state changes of the logic steps 87 and 88 in response to either a positive speed error being detected or a RATE TRIP being indicated.

With reference now to FIG. 6, the first subsystem 100 of the wheelslip control function 65 will be more particularly described. Persons skilled in the art will understand that in practice the functions shown schematically in FIG. 6 are best implemented by suitably programming the microcomputer that comprises the preferred embodiment of the controller 26. The speed error value (DeltaW) is computed by algebraically combining, at a summing point or step 102, four different input values. The first input is the previously described highest speed value (WMAX) taken from one output of the detecting function 77 in the speed signal processor 68 (FIG. 4). The second input is obtained from a least-value gate 104 which selects the smaller of two values: the reference speed value provided by the reference speed generator 200, and the lowest speed value (WMIN) taken from the other output of the detecting function 77. Although the reference speed value is usually equal to or smaller than WMIN, it may be larger under some circumstances, (e.g., while the locomotive is decelerating in its motoring mode). The second input is subtracted from the first input.

The third input to the summing point 102 is the aforesaid maximum difference speed value. It is set at a variable percentage of the reference speed value. As is illustrated symbolically in FIG. 6, the reference speed value is reduced to the desired percentage by a multiplying step 106 the output of which provides one input to a greatest-value gate 108. The gate 108 has a second input coupled to a minimum level block 110 that supplies a relatively low, constant value, and it selects the larger of its two inputs as the value that is supplied, via a line 112, to the summing point 102. The latter value is representative of the maximum creep speed, i.e., the normally desired maximum difference between the reference speed and WMAX. The purpose of the greatest-value gate 108 is to prevent the maximum difference from decreasing below a predetermined minimum speed (e.g., in a range from approximately 0.5 to 1.0 mph) when the reference speed is relatively low (e.g., less than 8 mph).

The output of the multiplying step 106 is the product of the reference speed value and a variable fraction which is also a function of the reference speed value, as determined by a function generator 114. Preferably, the generator 114 is operative to vary this fraction inversely with the reference speed as the reference speed varies between a predetermined first value (e.g., approximately 10 mph) and a predetermined second value (e.g., approximately 17 mph). For example, the fraction is variable between a maximum limit of approximately ⅛ (so that the maximum difference speed would equal 12% of the reference speed if reference speed were lower than its first value but higher than the speed at which the output of the multiplying step 106 is the same as the low value supplied by the minimum level block 110) and a minimum limit in a range of approximately 1/25 to 1/12 (so that the maximum difference speed is not less than 4% of the reference speed so long as the reference speed is higher than its second value). As a result, the maximum difference speed will be a desirably higher percentage of reference speed when track speed is low than when track is relatively high, and the percentage decreases smoothly from maximum to minimum limits as the locomotive accelerates. As is shown in FIG. 6, the maximum difference speed value on the line 112 (i.e., the third input to the summing point 102) is subtracted from WMAX (i.e., the first input).

The fourth input to the summing point 102 is a variable value equal to the product of two input values of a multiplying function 116. The first input (TIME) is a variable factor taken from a synchronous slip timer in the reference speed generator 200 of the wheelslip control function 65. As will soon be explained when FIG. 7 is described, this factor is normally zero, but it will increase at a linear rate from 0 to a maximum of 1.0 if the synchronous slip timer were activated in response to an incipient synchronous slip condition being indicated by either of two events: (1) the output count of the logic means 85 (FIG. 4) is less than a certain amount, thus indicating that the number of slipping axle-wheel sets exceeds a desired limit; or (2) the lowest rate value (dW/dtMIN) equals or exceeds a predetermined pickup level, thus indicating that all six axle-wheel sets are changing speeds at excessively high rates.

The second input to the multiplying function 116 is proportional to the normally desired maximum difference speed; it is obtained by multiplying, in a step 118, the maximum difference value on the line 112 and a predetermined number (at least approximately 2, and preferably 3). The resulting product of this multiplying step is a chosen multiple of the maximum difference speed value, and it provides one input to a greatest-value gate 120. The latter gate has another input coupled to a minimum level block 122 supplying a constant value corresponding to a predetermined minimum speed (such as approximately one mph), and it selects the larger one of its inputs as the value that is supplied as the second input of the multiplying function 116. The greatest-value gate 120 will prevent the second input from decreasing below a minimum level corresponding to a predetermined minimum speed when the maximum difference speed is lower.

It will now be apparent that the output of the multiplying function 116 is 0 so long as its TIME input is 0, but when the synchronous slip timer is activated the value of this output starts increasing toward an upper limit equal to the chosen multiple of the maximum difference speed value. Consequently, the fourth input to the summing point 102 is a variable value that increases with the length of time that the synchronous slip timer is activated. The rate of increase will vary with the maximum difference speed value on the line 112 (but cannot fall below a minimum rate determined by the minimum level 122), whereby the fourth input increases more rapidly at relatively high track speeds than at lower speeds.

The fourth input to the summing point 102 is added to the first input (WMAX), thereby tending to increase or boost, in a positive direction, the speed error value (DeltaW) obtained at the output of this summing point. In effect, the fourth input reduces the aforesaid desired value of the highest axle-wheel speed by a variable amount corresponding to the value of the fourth input. In other words, the desired speed equals the sum of the reference speed plus the normally desired maximum difference speed minus said variable amount. In operation, if some but not all of the axle-wheel sets were actually slipping and the synchronous slip timer were not activated, the value of WMAX would be greater than the sum of the reference speed value plus the maximum difference speed value. Alternatively, if enough axle-wheel sets were slipping (or if all sets were accelerating fast enough) to activate the synchronous slip timer, the sum of the reference speed value plus the maximum difference speed value minus the variable value of the fourth input to the summing point 102 would become less than the value of WMAX. In either event, the actual highest speed would be greater than desired, and the speed error value would have a positive sign and a magnitude determined by the size of the deviation from desired speed.

The speed error value derived from the summing point 102 in the subsystem 100 is tested by a suitable bistable polarity detecting means or step 124, and whenever it is positive (+DeltaW) the detecting step 124 is operative in conjunction with the logic step 87 (FIG. 5) to activate the deration mode of operation of the wheel-slip control function and the TRIP state of the logic step 88 as described hereinbefore. During the deration mode of operation, the speed error value is multiplied by a variable gain that is a predetermined function of the reference speed value to derive the voltage error value (DeltaV). In FIG. 6 the multiplying step is symbolically illustrated by a block 126 labeled "X" having first and second inputs, with the speed error value being supplied directly to the first input and the reference speed value being coupled via a function generator 128 and a normally open switch 130 to the second input. Whenever the deration mode is in effect, the switch 130 is closed and the multiplying function will be operative; otherwise the voltage error value is zero. The function generator 128 sets the value of the gain (i.e., the ratio of the voltage error value to the speed error value) that is supplied to the second input of the multiplying step 126 when operative. It is programmed so that the gain ("GAIN") has a predetermined minimum limit "K" (e.g., 1.0) and increases in a non-linear manner to a predetermined maximum limit (e.g., 22.5) as the reference speed increases to a relatively high value (e.g., 70 mph). Thus, GAIN is dependent on reference speed, and preferably it varies in accordance with approximately the second power of the reference speed value so that over a wide range of track speeds the voltage error value will be just large enough to cause tractive effort to decrease a predetermined desired amount (corresponding, for example, to a reduction in total traction motor current of 200 amps) in response to a speed error of 1 mph. As a result, the corrective action of the wheel-slip control function will be sufficient to cure any wheelslip condition that occurs at high track speeds (when the ratio of motor current [and thus torque] to voltage is relatively low) without undesirable overshoot if a wheelslip occurs at low track speeds. In a practical embodiment of the invention the functions explained above in this paragraph are actually implemented by the software shown in FIG. 10 and described below.

FIG. 7 illustrates the presently preferred way to implement the reference speed generating and synchronous slip timing functions represented by the block 200 in FIG. 5. The controller 26 is suitably programmed to execute the FIG. 7 routine 50 times a second. The routine starts at an inquiry point 202 which determines whether or not the locomotive throttle 36 is being moved from its idle position to its first power position (N1). The answer to this inquiry will be true whenever the operator is commanding the locomotive to accelerate from rest. (In the flow charts, Y stands for yes or an affirmative answer to an inquiry, and N stands for no or a negative answer.)

If the answer to the first inquiry 202 were affirmative, the FIG. 7 routine would immediately execute a reference speed initializing step 204 before it proceeds to the next inquiry point 206. In the step 204, a temporary register of the microcomputer (herein referred to as the "reference speed" register) is loaded with the value of WMIN (in binary form) which represents the rotational speed of the slowest axle-wheel set as detected by the speed signal processor 68. The next inquiry 206 tests whether or not WMIN is less than the value stored in the reference speed register. If affirmative (indicating that the locomotive is decelerating), the routine proceeds from inquiry 206 to a step 208 which is used, if necessary, to ensure that two bistable flags ("minimum rate" and "maximum rate," respectively) are in first or reset states (herein referred to as turned off or "false"). After executing the step 208, the FIG. 7 routine automatically proceeds to a step 210 where a delta value is calculated by subtracting WMIN from the reference speed value and multiplying the difference by a desired gain ("REF-DN"). The step 210 is followed by an inquiry step 212 to determine whether or not the calculated delta value exceeds a preset slew limit: if true, the delta value is reduced to the value of the slew limit at a step 214. This is automatically followed by an inquiry 216 to determine if the delta value is less than the reference speed value. If so, a step 218 is executed to decrement or reduce the value stored in the reference speed register by an amount equal to the delta value; otherwise, the stored reference speed value is reduced to zero by a step 220. In either event, the reference speed generating routine ends here.

Alternatively, if the locomotive were either accelerating or not changing speed, or if there is an actual or incipient wheelslip condition, the answer to the inquiry 206 would be no, and the FIG. 7 routine would then proceed from this inquiry point to a decision step 222. The latter step determines whether or not the number (#) of non-slipping axle-wheel sets is below a predetermined limit "LIM" (e.g., 2 for a locomotive having six powered axle-wheel sets): if # were below LIM, an affirmative answer would be obtained at the step 222 and the routine would proceed directly from 222 to a timer-activating step 224; otherwise the next step to be executed would be another inquiry 226. In other words, an affirmative answer at the decision step 222 indicates that the number of slipping axle-wheel sets is above a desired maximum limit (e.g., 4). In this event, as was explained hereinbefore, a synchronous slip condition is imminent, and now a counter will be incremented by a predetermined number, up to a certain maximum count, at the step 224. The counter-incrementing step is the synchronous slip timer, and it is the last step of the reference speed generating routine when the decision step 222 is affirmative. The count stored in the counter determines the aforesaid TIME input to the multiplying function 116 in the subsystem 100 (see FIG. 6), and the maximum count corresponds to a TIME factor of 1.0. So long as # is below LIM, the count will be periodically increased every time the FIG. 7 routine is executed, each increment being equal to the predetermined number until the maximum count is reached. By way of example, the predetermined number can be 1/250 of the maximum count, whereby an interval of five seconds is required for the TIME factor to complete its maximum excursion from 0 to 1.0. Thus the count stored in the counter is a measure of the time that the number of slipping axle-wheel sets is above the desired limit.

The counter-incrementing step 224 is also activated every time the FIG. 7 routine is executed when the number of slipping axle-wheel sets is not above the desired limit (i.e., # is not below LIM) if the lowest rate value dW/dtMIN then equals or exceeds the predetermined pickup level ("A") that indicates a relatively rapid onset of a synchronous slip condition. As is shown, when there is a negative answer at the decision step 222 the next step 226 of the routine is to test the state of the minimum rate flag. So long as this flag is not in its second or set state (herein referred to as turned on or "true"), the routine proceeds via a step 228 to an inquiry 230 which determines if the lowest rate of change of speed detected by the speed signal processor 68 is at least as high as A. While not shown in FIG. 7, means is provided for varying A as a function of the magnitude of traction motor current. Only if the answer to the inquiry 230 is yes, the counter-incrementing step 224 is activated via a step 232 that changes the setting of the bistable minimum rate flag from false to true. Once the steps 232 and 224 are executed, the FIG. 7 routine ends, but the next time through this routine the answer to the inquiry 226 will be yes instead of no. Now an inquiry is made at a step 234 to determine whether or not the lowest rate value is less than the dropout level "B" which is a predetermined faction of A. If not, the latter step is immediately followed by the counter-incrementing step 224. Alternatively, if and when dW/dtMIN decreases below B, the routine will automatically proceed from the step 234 to the step 228 where the bistable minimum rate flag is reset to its false state, and from the step 228 via the inquiry step 230 to another decision step 236 which determines whether or not the number of non-slipping axle-wheel sets equals the aforesaid predetermined amount. If the answer at the latter step were affirmative, the FIG. 7 routine would end here; otherwise the number of slipping axle-wheel sets is below the desired limit, and the routine will now proceed from the decision step 236 to a step 238 that resets the aforesaid counter (i.e., the synchronous slip timer) to its normal state of zero.

After the counter is reset at the step 238, the next step 240 of the FIG. 7 routine is to test the state of the maximum rate flag. As long as this flag is not in its second or set state (herein referred to as turned on or "true"), the routine proceeds via a step 242 to an inquiry 244 which determines if the highest rate value dW/dtMAX is at least as high as a predetermined pickup level which preferably is the same as the aforesaid pickup level A. If the answer to the inquiry 244 is yes, the FIG. 7 routine ends after a final step 246 that changes the setting of the bistable maximum rate flag from false to true. The next time through this routine after the step 246 has been executed, the answer to the inquiry 240 will be yes instead of no. Now an inquiry 248 is made to determine whether or not the highest rate value is less than a predetermined dropout level (preferably the same as B). If not, the latter step concludes the FIG. 7 routine. Alternatively, if and when dW/dtMAX decreases below B the routine will automatically proceed from the step 248 to the step 242 where the bistable maximum rate flag is reset to its false state. From the latter step the routine proceeds via the inquiry 244 (the answer to which is now negative, since B is lower than A) to the next step 250. Note that if the answer to inquiry 206 were to change from no to yes at any time after step 246 sets the maximum rate flag in its true state but before this flag is reset to its false state by the step 242 (or after the minimum rate flag is set in its true state by step 232 but before it is reset by step 228), the rate flag would be reset by the step 208.

In the step 250 a delta value is calculated by subtracting the reference speed value from WMIN and multiplying the difference by a desired gain ("REF-UP"). This step is followed by an inquiry step 252 where the calculated delta value is compared with a preset slew limit: if the calculated value exceeds the limit, it is reduced to the value of the slew limit at a step 254. This is automatically followed by a step 256 that increments or increases the value stored in the reference speed register by an amount equal to the delta value, and the reference speed generating routine ends here.

The operation of the reference speed generator illustrated in FIG. 7 will now be briefly summarized. During normal deceleration of the locomotive, the answer to the inquiry 206 is affirmative and the steps 208-220 will be effective to ensure that the reference speed value tracks the decreasing lowest speed value WMIN, with the rate of reference speed change corresponding to the rate at which WMIN is varying up to a maximum rate determined by the preset slew limit. During normal acceleration of a locomotive, the answer to the inquiry 206 is negative and the steps 222, 226, 228, 230, 236, 238, 240, 242, 244, and 250-256 will be effective to ensure that the reference speed value tracks the increasing WMIN, with the rate of reference speed change again corresponding to the rate at which WMIN is varying up to the same maximum rate. In either case, the reference speed value will vary with the rotational speed of whichever one of the axle-wheel sets has the lowest speed. That one set normally is not slipping, and its speed is therefore an accurate measure of the actual track speed.

However, the illustrated routine will not appreciably change the reference speed value whenever any of the following abnormal events is detected: (1) # is equal to or less than LIM, as indicated by an affirmative answer at either one of the decision steps 236 and 222 (i.e., when the number of slipping axle-wheel sets equals or exceeds the desired maximum limit); (2) dW/dtMIN increases to at least A and then remains above B, as indicated by the minimum rate flag being set in its true state (i.e., when the lowest rate value is abnormally high); or (3) dW/dtMAX increases to at least A and then remains above B, as indicated by the maximum rate flag being set in its true state (i.e., when the highest rate value is excessively high). The first or second of these three events can occur when most or all of the axle-wheel sets begin to slip, as would be true if a synchronous slip condition were to develop while the locomotive is traveling at a speed in excess of approximately 10 to 15 mph, and in either event the reference speed is prevented from deviating greatly from a value corresponding to the actual track speed which tends to remain constant during synchronous slips. The third event can occur when any one of the axle-wheel sets is changing speeds at an excessively high rate, as would be true if at least one set were to slip while the locomotive is traveling at a relatively low track speed, and in this event the reference speed is prevented from changing from a value corresponding to the actual track speed at the time when the excessive rate is detected so as more closely to match the track speed desired when the system subsequently recovers from the wheelslip condition.

The reference speed generator 200 includes the synchronous slip timer (step 224) which is activated either by the above-mentioned dW/dtMIN event or when the number of non-slipping axle-wheel sets falls below the aforesaid predetermined amount or limit. In either case, the step 224 is executed during each pass through the FIG. 7 routine, thereby periodically increasing the TIME factor from 0 toward 1.0 at a linear rate. Consequently, the multiplying function 116 (FIG. 6) will now be operative to increase its output at a rate that varies with the normally desired maximum difference speed so as correspondingly to boost the speed error value (DeltaW) as previously explained. If this synchronous slip timing action were initiated by # falling below LIM (e.g., 2), when # subsequently increases to a number equal to LIM whatever count is then stored in the counter (step 224) would be saved. As a result, the TIME factor is "frozen" until # either again falls below such limit (whereupon an affirmative answer is again obtained at the decision step 222 and the step 224 will be effective during each pass through the routine to resume incrementing the counter from its saved count toward its maximum count) or rises above such limit (whereupon a negative answer is obtained at the decision step 236 and the next step 238 then resets the counter to a zero count). In other words, after the number of slipping axle-wheel sets increases above the desired limit (e.g., 4), the synchronous slip timing step 224 is operative periodically to increase the TIME factor that is used as an input to the multiplying function 116, thereby increasing the variable value that the latter function contributes to the summing point 102 (see FIG. 6). Subsequently, as the system recovers from a wheelslip condition, the number of slipping axle-wheel sets will decrease. Now the decision step 236 is operative to hold the TIME factor (and hence the variable value at the output of the multiplying function 116) relatively constant so long as the number of slipping sets equals the desired limit, whereas the resetting step 238 is operative abruptly to reduce this factor (and hence the variable value) to zero in response to the number of slipping sets decreasing to below such limit. As soon as the synchronous slip timer is thus reset and the variable value is thereby reduced to zero, there is a corresponding step decrease of the speed error value, and this event can cause the wheelslip control function immediately to switch from deration to recovery modes of operation. The decision step 236 will delay this event until the number of slipping axle-wheel sets falls below the limit, at which point there is less likelihood of a borderline synchronous slip condition causing undesirably rapid cycling between recovery and deration modes of operation.

Figure 8:
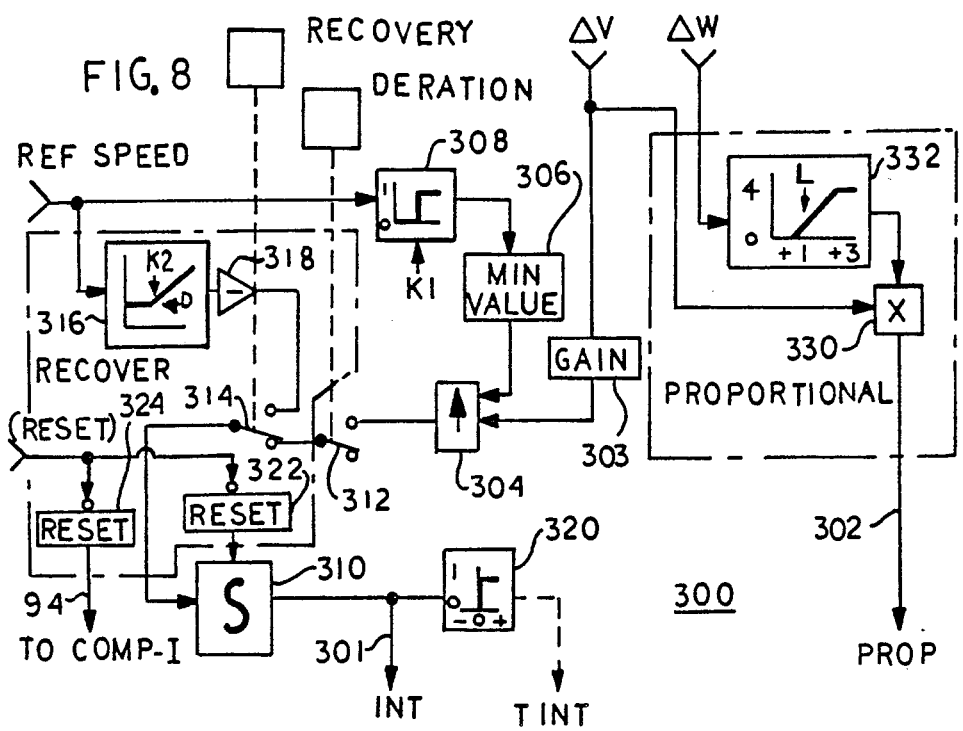
FIG. 8 is a block diagram of the integrating and proportional functions of the FIG. 5 wheelslip control.
Figure 11:
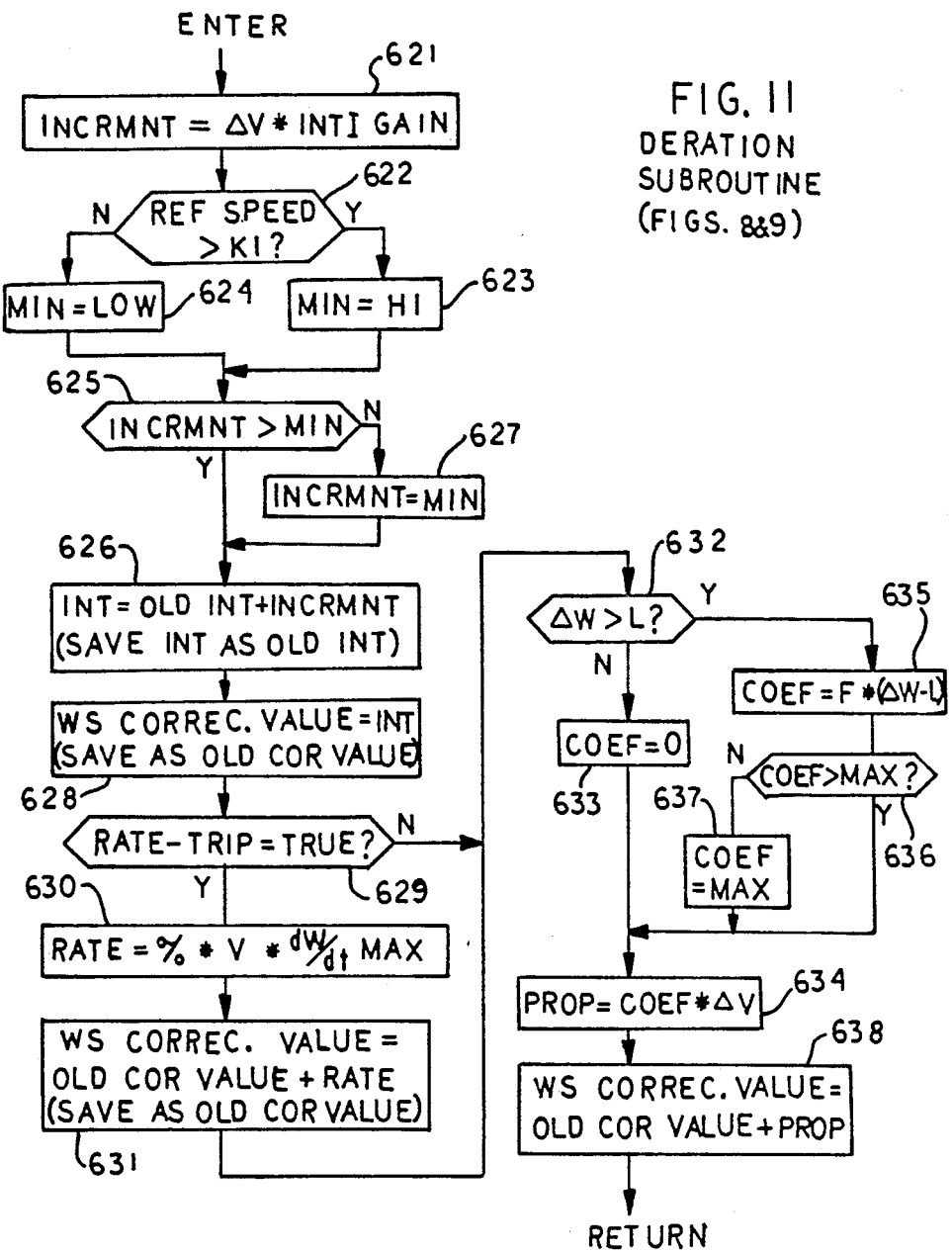

It will now be apparent that the reference speed generator 200 (FIG. 7) provides both the reference speed value and the TIME factor without using a radar unit or an extra, unpowered wheel or roller to measure the actual track speed of the vehicle. In the manner illustrated in FIG. 6 and previously described, the reference speed value is algebraically summed with the highest speed value, the maximum difference speed value at the output of the greatest-value gate 108, and, when the synchronous slip timer is active, the variable value at the output of the multiplying function 116 so as to derive the speed error value (DeltaW) which is multiplied by a variable gain to derive the aforesaid voltage error value (DeltaV). The latter value is integrated in the third subsystem 300 of the wheelslip control function 65. FIG. 8 illustrates the subsystem 300 functionally, it being understood that in practice these functions are best implemented by suitably programming the microcomputer comprising the preferred embodiment of the controller 26. (Flow charts of the presently preferred software are shown in FIGS. 11 and 12 and will soon be described.)

As is illustrated in FIG. 8, the voltage error value is passed through a transfer function or gain 303 to one input of a greatest-value gate 304, the other input of which comprises a predetermined minimum value obtained from suitable means 306. The latter means is programmed to change the minimum value from a first, relatively low amount to a second, higher amount in response to the reference speed value increasing above a predetermined level "K1" as detected by associated level detecting means 308. (K1 is attained, for example, at a relatively low reference speed of 8 mph.) The greatest-value gate 304 selects the larger of its two inputs as the value that is supplied, via first and second series-connected switches 312 and 314, respectively, to the input of an integrating function 310. The first switch 312 is normally open, but it will be closed whenever the deration mode of operation is in effect. The other switch 314 has two alternative positions or states: normally it is in the state shown in FIG. 8 so as to connect the input of the integrator 310 to the switch 312; but whenever the recovery mode of operation is in effect, the switch 314 is in its second state, thereby connecting the integrator input to the output of an alternative source 316 that is independent of the speed and voltage error values. Suitable means 318 is provided for inverting the polarity of the latter output, whereby the integrator input is negative whenever the switch 314 is in its second state. The source 316 is supplied with the reference speed value, and it is programmed so that its output varies with the latter value so long as the latter value exceeds a certain level "K2" corresponding to a predetermined reference speed (e.g., seven mph). This source is also programmed so that at relatively low reference speed values (less than K2), its output has a preselected minimum value "D."

The integrator 310 is operative to produce the aforesaid variable value INT on the first output line 301 of the subsystem 300. During the deration mode of operation, INT will be representative of the time integral of DeltaV. In other words, the integrator output increases at an average rate that varies with the voltage error value. This rate of increase will not be less than a minimum determined by the minimum value obtained from the means 306. During the recovery mode of operation, the alternative source 316 is operative to decrease INT at an average rate that is independent of both the voltage error value and the speed error value, and that is a function of the reference speed. More particularly, the rate of INT decrease will vary with the reference speed value so long as the latter value exceeds K2, and it equals a constant minimum rate whenever the reference speed value is less than K2. The minimum rate (preferably chosen to cause the rectified output voltage of the main alternator 12 to decrease at a rate of approximately 0.75 volts per second) is determined by the selection of the minimum output value D of the alternative source 316.

From the previous description of the logic step 92 (FIG. 5) it will be recalled that the recovery mode becomes effective whenever the speed error changes from a positive value to a negative value (or zero), and it is deactivated as soon as the INT value returns to zero and is therefore no longer positive. If the propulsion system were operating in a normal creep-regulating mode, the wheelslip control function 65 would repeatedly cycle between deration and recovery modes as WMAX gradually varies between values that are slightly greater and slightly less than the desired speed. During the alternate intervals when the speed error value has a positive direction or sign, INT would ramp-up from zero and thereby reduce the power reference value on the line 66 (FIGS. 3 and 5), whereas during the intermittent intervals when the speed error value is not positive, INT would ramp down to zero and thereby increase the value on the line 66 which has the effect of restoring traction power.

As is illustrated in FIG. 8, the integrator output INT is tested by a suitable bistable polarity detecting means or step 320 coupled to the line 301, and so long as INT is relatively positive (+INT) the detecting step 320 is operative in conjunction with the WS INCONTRL indication from the subsystem 500 to cause the output of the AND logic step 91 to be in its high state which keeps the OR logic step 88 in its TRIP state (see FIG. 5). Thereafter, as soon as either INT has been reduced to zero or the wheelslip control function loses control (i.e., the power reference value on the line 64 becomes lower than the reduced reference value on the line 66), the AND logic step 91 is de-activated and its output state will therefore change from high to low, whereupon a reset function 322 becomes effective to ensure that the output of the integrator 310 is clamped to zero. At the same time, a companion reset function 324 is effective to re-initialize the system compensation values used in the compensation routine 63 (FIG. 3) to which the function 324 is coupled via the line 94.

The third subsystem 300 includes a multiplying function or step 330 for producing the aforesaid variable value PROP on its second output line 302. The voltage error value is applied directly to one of the two inputs of this step 330, and the speed error value is coupled via a function generator 332 to the second input. The function generator 332 is programmed to provide a variable multiplier that increases from zero to a predetermined maximum number (e.g., four) as the speed error value increases above a predetermined level "L" which corresponds, for example, to a speed error of one mph. In other words, whenever DeltaW is higher than L, 332 is effective to supply to the second input of the multiplying step 330 a multiplier that varies with the difference therebetween. Consequently, only when the speed error value is positive and exceeds L the multiplying step 330 is operative to produce PROP which will then be related to the voltage error value by a coefficient that varies between zero and the aforesaid maximum number as the speed error value varies between L and a predetermined second level higher than L. In practice, DeltaW will usually increase to a value exceeding L when the multiplying function 116 is operative to supply the fourth input to the summing point 102 (see FIG. 6) as a result of activation of the synchronous slip timer (step 224 in FIG. 7) in the reference speed generator 200, whereby PROP will rise quickly from zero in response to an incipient or actual synchronous slip condition being indicated at either one of the steps 222 and 230 of the FIG. 7 routine.

As was previously explained, the wheelslip control function 65 includes summing means 90 (FIG. 5) for algebraically combining the values labeled PROP and INT from the subsystem 300 and the value labeled RATE from the subsystem 400 to derive the wheelslip correction value that serves as an input to the fifth subsystem 500, whereby the correction value comprises the sum of these three separate values or amounts which are representative, respectively, of the product of DeltaV and a multiplier that varies with the amount by which DeltaW exceeds L, of the time integral of DeltaV, and of the product of V and dW/dtMAX if the latter exceeds the pickup level A.

Figure 9:
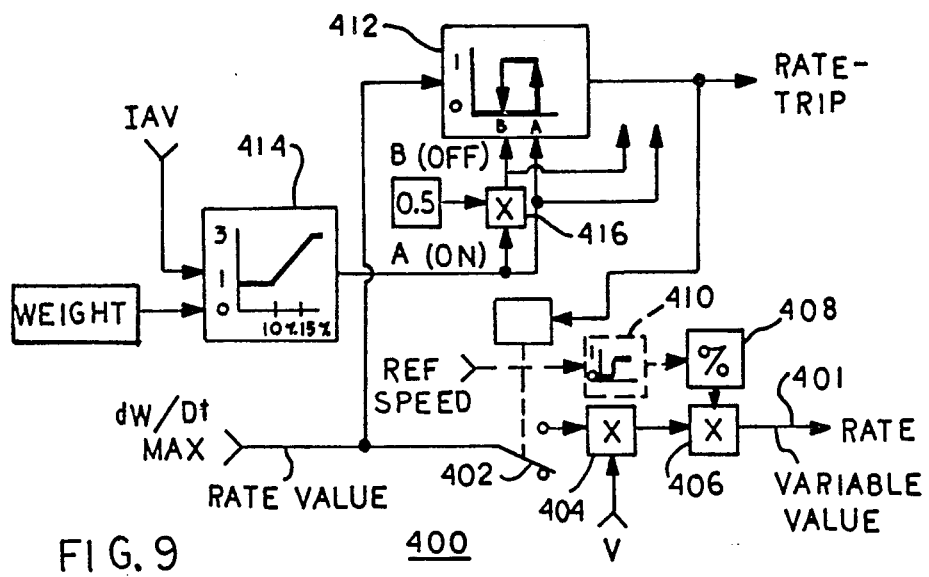
FIG. 9 is an expanded block diagram of the rate function shown as a single block in FIG. 5.

With reference now to FIG. 9, the fourth subsystem 400 from which RATE is obtained will be more particularly described. In practice the functions shown schematically in FIG. 9 are best implemented by suitably programming the microcomputer that comprises the preferred embodiment of the controller 26. The subsystem 400 is arranged to convert the highest rate value (dW/dtMAX), taken from one output of the rate comparing and detecting means 81 in the speed signal processor 68 (FIG. 4), into the variable value RATE which is proportional to the product of the absolute magnitude of dW/dtMAX and the value of V. For this purpose the highest rate value is coupled via a normally open switch 402 to one input of a first multiplying function or step 404 the other input of which receives the voltage feedback signal V, and the resulting product of the first step 404 is multiplied by a predetermined fraction ("%") in a companion multiplying step 406. (The two multiplying steps 404 and 406 may be implemented concurrently in practice.) The predetermined fraction is obtained from suitable means 408 which can be programmed, if desired, to increase this fraction in response to the reference speed value increasing above a predetermined level as detected by an optional level detector 410. The multiplying steps 404 and 406 are effective when the switch 402 is closed to produce the aforesaid variable value RATE on the output line 401 of the subsystem 400. The latter value depends on both the highest rate value and the value of V, being the predetermined percentage of their product.

Whenever a RATE TRIP is indicated, the switch 402 is closed and the multiplying steps 404 and 406 will be operative as described above; otherwise RATE is zero. The subsystem 400 includes suitable bistable level detecting means responsive to the highest rate value for determining whether or not to indicate a RATE TRIP condition. In FIG. 9 this level detecting means is illustrated as a single block 412 which is functionally the same as the steps 240-248 of the FIG. 7 routine. It has a normal or reset state in which its output is low or "0" and a set or RATE TRIP indicating state (coinciding to the turned on or "true" state of the maximum rate flag) in which its output is high or "1." The latter state begins whenever the highest rate value increases to at least the pickup level A, and it terminates whenever the highest rate value subsequently decreases below the dropout level B. As is illustrated in FIG. 9, A is determined by suitable means 414, and B is a predetermined fraction (e.g., one-half) of A as determined by a multiplying step 416. These two levels are fed in tandem to both the level detecting means 412 and the reference speed generator 200. In an optional feature of the invention, the pickup level determining means 414 is a function generator suitably programmed to vary A as a predetermined function of the wheel-rail adhesion of the locomotive. The adhesion level is estimated from the known weight of the locomotive and from the magnitude of traction motor current, as represented by the value of the average current feedback signal IAV derived in the current processor 55 (FIG. 3). The value of IAV tends to vary with the level of adhesion; that is, as adhesion changes, motor current (and hence torque) will change correspondingly. The relationship between IAV and adhesion for a given weight can be stored in a lookup table of the microcomputer. The function generator 414 is so arranged as to vary A with the adhesion level as the adhesion level varies between predetermined first and second percentages (e.g., 10% and 15%, respectively), and it includes means for determining maximum and minimum limits between which A can vary. The pickup level A will remain equal to the minimum limit (e.g., one mph per second) when the adhesion level is lower than the first percentage, it will remain equal to the maximum limit (e.g., three mph per second) when the adhesion level is higher than the second percentage, and it tracks the adhesion level inbetween these values. With A being varied in this manner, the level detecting means 412 will be more sensitive at low adhesion levels (e.g., slippery rails) than at higher adhesion levels (e.g., dry rails).

Whenever the speed of at least one of the axle-wheel sets starts to increase at an excessively high rate while the track speed of the locomotive is relatively low (e.g., less than approximately 10-15 mph), the highest rate value attains the pickup level A and the level detecting means 412 then changes states to indicate a RATE TRIP condition. The acceleration at which this state change takes place is less when the adhesion is low and a wheelslip condition is more likely to occur than when adhesion is relatively high. Once the state change takes place, the logic step 87 (FIG. 5) ensures that the deration mode of the wheelslip control function 65 is activated, and the switch 402 (FIG. 9) is closed to enable the multiplying steps 404 and 406 of the subsystem 400 to feed the variable value RATE to the summing means 90 (FIG. 5) as previously explained. The latter value (which is proportional to the product of the highest rate value and the value of V), will increase the wheelslip correction value at the output of the summing means 90, and the power reference value on the line 66 is consequently reduced a corresponding amount so as to prevent a wheelslip condition from occurring or to cure one that has already occurred.

Figure 10:
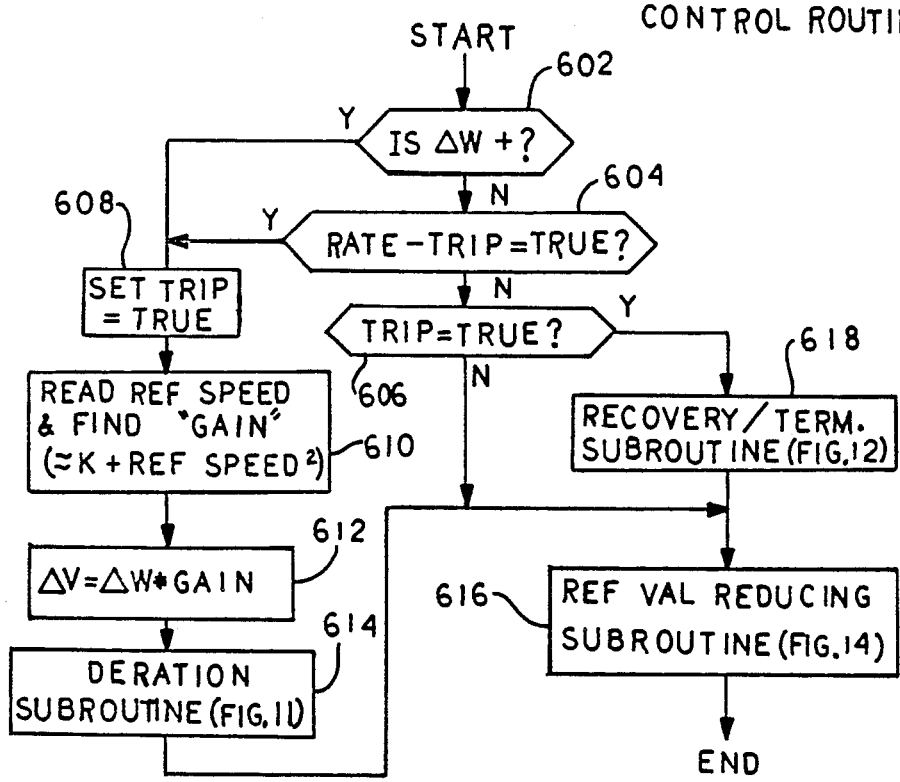

The deration and recovery modes of operation will now be reviewed with reference to FIGS. 10-12 which are flow charts of the presently preferred software for implementing the functions shown schematically in FIGS. 8 and 9. The wheelslip mode control routine illustrated in FIG. 10 is automatically executed 5D times per second. It begins at a first inquiry step 602 (equivalent to the polarity detecting step 124 in FIG. 6) that checks whether or not the speed error value obtained at the output of the summing point 102 (FIG. 6) is positive. If not, a second inquiry step 604 of the routine will check the state of a bistable "rate-trip" flag. This flag is the above-mentioned maximum rate flag which is changed from a reset or false state to a set or true state by the step 246 in the reference speed generating routine shown in FIG. 7 and which is returned to its reset state by the step 242 or 208, and it is equivalent to the level detecting means 412 shown in FIG. 9. Until the rate-trip flag is set in a true or high state, no RATE TRIP is indicated and the FIG. 10 routine automatically proceeds from the step 604 to a third inquiry step 606 that will soon be described. Alternatively, if the answer at either one of the inquiry steps 602 and 604 were affirmative (equivalent to the OR logic step 87 in FIG. 5 having a high output state), that step would be immediately followed by a step 608 where the setting of a bistable "trip" flag is changed, if this flag were then in its reset or "false" state, to a set or "true" state (equivalent to the OR logic step 88 in FIG. 5 being in its TRIP state).

The FIG. 10 routine proceeds from the step 608 to a step 610 which reads the values stored in the aforesaid reference speed register (see description of FIG. 7) and finds GAIN by multiplying the reference speed value by itself and adding the minimum limit K to the product. This step includes means for imposing a predetermined maximum limit on GAIN. In the next step 612 the positive speed error value is multiplied by GAIN, and the resulting product is the aforesaid voltage error value which is saved in a temporary register of the microcomputer. It will now be apparent that the steps 610 and 612 are equivalent, respectively, to the function generator 128 and the multiplying step 126 of the subsystem 100, as illustrated in FIG. 6 and described above.

The next step after the step 612 is to activate a deration subroutine 614, and this is automatically followed by execution of a reference value reducing subroutine 616 which completes the FIG. 10 routine. During every pass through the routine, the polarity of the speed error value is rechecked at the first inquiry 602, and if it is not positive, the rate-trip flag is rechecked at the second inquiry 604 to determine if this flag is still set in its true state. Whenever negative answers are obtained at both of the steps 602 and 604, the FIG. 10 routine proceeds to the third inquiry step 606 instead of to the step 608. The state of the trip flag is tested at the step 606. If not true, the routine proceeds directly to the subroutine 616. But if the trip flag were now in its true state (equivalent to the logic step 92 in FIG. 5 having a high output state), the routine would activate a recovery/termination subroutine 618 before proceeding to the step 616. Details of the presently preferred embodiment of the deration and recovery subroutines 614 and 618 will next be described with reference to FIGS. 11 and 12, respectively.

As is illustrated in FIG. 11, the deration subroutine is entered at a step 621 where the voltage error value that was saved at the preceding step 612 (FIG. 10) is reduced to a desired increment or step value ("INCRMNT") equal to the product of the voltage error value and a predetermined integrator gain (e.g., 0.08). Then the reference speed value is tested at an inquiry point 622 to determine whether or not it exceeds the predetermined relatively low level K1. If the answer were yes, the next step 623 would load a temporary register with a predetermined first minimum value "HI;" otherwise a step 624 is operative to load the same register with a second, lower minimum value "LOW." After the minimum value is set in this manner, it is compared with the aforesaid incremental value at a step 625. So long as the latter exceeds the former, the deration subroutine will proceed directly from the step 625 to an integrating step 626; otherwise the step 626 is preceded by an extra step 627 that makes the desired increment equal to the minimum value that was set at the step 623 or 624. It will now be apparent that the step 622 performs the same function as the level detecting means 308, the alternative steps 623 and 624 are equivalent to the minimum value means 306, and the steps 625 and 627 are equivalent to the greatest-value gate 304 of the subsystem 300, as illustrated in FIG. 8 and described above.

In the integrating step 626 of the deration subroutine, the aforesaid increment is added to an "OLD INT" value taken from a temporary register of the microcomputer (herein referred to as the "old integrator value" register), and their sum is the previously described variable value INT which increases in a positive direction at an average rate that varies with the voltage error value. The step 626 also reloads this sum (in binary form) into the old integrator value register where it is saved as OLD INT for the next pass through the FIG. 11 subroutine. In an associated step 628 that follows the integrating step 626, the same sum (INT) is loaded into another temporary register (herein referred to as the "wheelslip correction value" register) where it is saved as the "old correction" value.

After the steps 626 and 628 have been executed, the state of the rate-trip flag is checked at an inquiry point 629. If this flag were in its set or true state (indicating that the highest rate value dW/dtMAX has attained at least the pickup level A), the subroutine would proceed from the inquiry 629 to a step 630 where dW/dtMAX and the value of the voltage feedback signal V are retrieved and multiplied and the resulting product is multiplied by the predetermined fraction "%." Thus the step 630 is effective to produce the previously described variable value RATE that depends on both the highest rate value and the voltage feedback value (see functions 404–408 of the subsystem 400 as illustrated in FIG. 9). It is automatically followed by a summing step 631 that adds RATE to the value saved in the wheelslip correction value register, and the resulting sum is reloaded into this register where it is saved as the old correction value. It will be apparent that once the rate-trip flag changes from false to true states, the correction value saved at step 628 is increased when the step 631 is executed during each pass through the deration subroutine, and the size of the increment (RATE will increase as the product of dW/dtMAX and V increases.

From the step 631 the deration subroutine proceeds to another inquiry point 632. Alternatively, if no RATE TRIP were indicated and therefore the answer to the inquiry 629 were negative, the inquiry 632 would immediately follow the inquiry 629. The inquiry point 632 determines whether or not the speed error value DeltaW is greater than the predetermined level L. If not, the next step 633 will set the aforesaid variable coefficient equal to zero, and this is followed by a step 634 where the voltage error value DeltaV is multiplied by the coefficient. The resulting product will be zero so long as the coefficient is zero. Alternatively, if the answer to the inquiry 632 were affirmative, the step 634 would not be executed until after a step 635 which is programmed to calculate the variable coefficient by subtracting L from DeltaW and multiplying the difference by a predetermined constant F. Thus the coefficient will increase linearly from zero as DeltaW increases above L. The step 635 is followed by an inquiry 636 that tests whether or not the calculated coefficient is less than the aforesaid maximum number ("MAX"). If the answer to this inquiry were affirmative, the subroutine would proceed directly to the step 634; otherwise, a step 637 sets the coefficient equal to MAX (e.g., four) before proceeding to the step 634. In either event, the step 634 is now effective to produce the previously described variable value PROP that is proportional to both DeltaV and the variable coefficient. (It will be apparent that the steps 632, 633, and 635-637 are equivalent to the function generator 332, and the step 634 is the same as the multiplying step 330 of the subsystem 300, as illustrated in FIG. 8 and described above.)

After the step 634 is executed, the FIG. 11 subroutine will return to the wheelslip mode control routine (FIG. 10) via a final step 638 that adds PROP to the old correction value. The value derived from the step 638 is the previously described wheelslip correction value that corresponds to the sum of INT, RATE and PROP. Thus the two summing steps 631 and 638 of the deration subroutine are functionally equivalent to the summing means 90 shown in FIG. 5. It will be apparent that so long as DeltaW exceeds L, during each pass through this subroutine the final summing step 638 will effect a step increase of the value saved in the wheelslip correction value register, and the size of the step or increment (PROP) equals the product of DeltaV and the variable coefficient which in turn depends on the amount by which DeltaW exceeds L up to a predetermined maximum limit.

So long as there is an affirmative answer at either one of the inquiry steps 602 and 604 (FIG. 10), the deration subroutine (FIG. 11) will be executed every pass through the wheelslip mode control routine. Consequently the above-described integrating step 626 will periodically increment the OLD INT value saved in the old integrator value register and will save the incremented value INT as OLD INT for the next pass through. The size of each increment, as determined by the step 621, is usually proportional to the voltage error value, and the number of such increments per second is constant (e.g., 50). The step 627 will be operative when the voltage error value is relatively low to prevent the increment from decreasing below the minimum size that is set at the step 623 or 624, thereby establishing a minimum rate of INT increase. The steps 622–624 will raise or lower this minimum rate in response to the reference speed value increasing above K1 or decreasing below K1, thereby ensuring that the minimum rate is higher at high track speeds than at relatively low track speeds.

If the answers at both of the inquiry steps 602 and 604 were negative, and the answer at the inquiry step 606 were affirmative (FIG. 10), the recovery/termination subroutine (FIG. 12) would be executed instead of the deration subroutine every pass through the wheelslip mode control routine. As is illustrated in FIG. 12, the recovery/termination subroutine is entered at a first inquiry step 641 (equivalent to the polarity detecting step 320 in FIG. 8) that checks whether or not the OLD INT value saved in the old integrator value register (see the step 626 in FIG. 11) is equal to zero. If not, a second inquiry step 642 of this subroutine will check the state of a bistable "wheelslip in control" flag. So long as there is a WS INCONTRL indication from the subsystem 500 (see the description of FIGS. 13 and 14 hereinafter), the wheelslip in control flag is set in a true or high state and the answer to the inquiry 642 is no. In this event the FIG. 12 subroutine will automatically proceed from the step to a third inquiry step 643 that will soon be described. Alternatively, as soon as the answer at either one of the inquiry steps 641 and 642 changes from negative to affirmative (equivalent to the output state of the AND logic step 91 in FIG. 5 changing from high to low), that inquiry step would be immediately followed by a step 644 where a plurality of functions associated with the termination of the recovery mode of operation are performed. For example, the system compensation values are re-initialized (see the description of the reset function 324 shown in FIG. 8), and both of the old integrator value and wheelslip correction value registers are loaded with zeros, thereby ensuring that both the OLD INT value and the wheelslip correction value are reset (see the reset function 322 in FIG. 8). In addition, the step 644 is effective to re-initialize the desired power value on the first output channel of the block 47 (FIG. 3) as necessary to ensure a smooth transition from the recovery mode of operation of the wheelslip control means to the ensuing motoring operation of the locomotive propulsion system. From the step 644 the FIG. 12 subroutine will return to the wheelslip mode control routine (FIG. 10) via an additional step 645 where the bistable trip flag is changed from its set or true state to a reset or false state (equivalent to de-activating the logic steps 91 and 88 in FIG. 5). Once the trip flag is thus reset, the inquiry step 606 (FIG. 10) will be effective to bypass the FIG. 12 subroutine during each subsequent pass through the FIG. 10 routine until the above-described step 608 again sets this flag in its true state in response to the occurrence of an actual or incipient wheelslip condition, as indicated at either step 602 (+DeltaW) or step 604 (dW/dtMAX equals or exceeds A).

During every pass through the FIG. 12 subroutine while the trip flag is in its true state and OLD INT is not zero and the wheelslip in control flag is not false, negative answers are obtained at both of the steps 641 and 642 (equivalent to the AND logic step 91 in FIG. 5 having a high output state). In this event, the subroutine proceeds to the third inquiry step 643 instead of to the step 644. The step 643 tests the reference speed value to determine whether or not it exceeds the aforesaid level K2. If the answer were yes, the next step 647 would calculate a desired decrement or step value ("DECRMNT") by subtracting K2 from the reference speed value, multiplying the difference by a predetermined constant "G," and adding the resulting product to the aforesaid minimum value D. If the answer to the inquiry step 643 were no, the subroutine would alternatively proceed from this step to a step 648 that makes the desired decrement equal to D. It will now be apparent that the steps 643, 647 and 648 are equivalent to the function generator 316 as illustrated in FIG. 8 and described above.

From either one of the steps 647 and 648 the FIG. 12 subroutine proceeds to another inquiry step 649 that determines whether or not the aforesaid decrement is less than the OLD INT value. If not, a step 650 will reduce the INT value to zero. Otherwise, the subroutine proceeds from the inquiry 649 to an integrating step 651 where the decremental value is subtracted from the OLD INT value. The resulting difference is the previously described variable value INT which now decreases at an average rate that varies with the size of the decrement. After either one of the steps 650 and 651 is executed, the next step 652 reloads the INT value (in binary form) into the old integrator value register where it is saved as OLD INT for the next pass through the FIG. 12 subroutine, and in a final step 653 before returning to the FIG. 10 routine, the same value is loaded into the aforesaid wheelslip correction value register.

So long as there are negative answers at both of the inquiry steps 641 and 642 and the desired decrement is less than OLD INT, the integrating step 651 will be executed every pass through the FIG. 12 subroutine. Consequently the OLD INT value is periodically decremented or reduced to a less positive value INT that is saved as OLD INT for the next pass through, and this value becomes the new wheelslip correction value at the step 653. The size of each decrement, as determined by the step 647, is proportional to the amount by which the reference speed value exceeds K2, and the number of such decrements per second is constant (e.g., 50). As a result, in the wheelslip recovery mode of operation the wheelslip correction value is reduced at a rate that varies with track speed, and the proportionality constant G is selected so that traction power will be restored at an optimum rate (e.g., approximately 50 HP per second per powered axle). The step 648 will be operative when the reference speed is relatively low to prevent the decrement from being less than the minimum size D, thereby establishing a minimum rate of correction value decrease. D is selected so that when the reference speed value does not exceed K2 the wheelslip correction value will decrease at a predetermined constant rate (corresponding to a desired rate of decrease of V), and now the rate of power restoration will vary with the track speed. As INT and the correction values approach zero, they will become smaller than the next decrement, whereupon they are returned to zero by the step 650, the answer at the inquiry step 641 will now change from no to yes, and the integrating step 651 becomes inoperative. Under most circumstances the answer to the inquiry step 642 will change from no to yes before the wheelslip correction value has been reduced to zero by the step 650 or 651, whereby the step 644 will be effective as previously explained to reset the integrating means so that the correction value and OLD INT are promptly returned to zero.

After each pass through either the recovery/termination subroutine 618 (FIG. 12) or the deration subroutine 614 (FIG. 11), or whenever negative answers are obtained at all three of the inquiry steps 602, 604 and 606 (equivalent to the logic steps 87 and 92 in FIG. 5 having low output states, whereby both the deration mode and the recovery mode are inactive), the reference value reducing subroutine 616 of the wheelslip mode control routine (FIG. 10) is executed to end the latter routine. The reference value reducing subroutine 616 in effect implements the fifth subsystem 500 of the wheelslip control function 65. A simplified version of its presently preferred embodiment is illustrated functionally in FIG. 13, and a flowchart of software suitable for implementing these functions is shown in FIG. 14.

As is illustrated in FIG. 13, the wheelslip correction value (which is the output of the summing means 90 in FIG. 5) is supplied to a summing point 502 where it is subtracted from a value supplied by memory means 504. The input of the memory means 504 is coupled to a lowest-value gate 506 via a normally closed switch 508 and an output line 510 of the gate. The switch 508 is open only when the logic step 88 (FIG. 5) is in its TRIP state, as is true throughout the deration and recovery modes of operation. The gate 506 has three inputs that are respectively coupled to the lines 51, 57 and 64 (see FIG. 3), and it selects the lowest of the three different reference values on these lines (voltage limit, current limit, and power, respectively) as the value on its output line 510. Normally the locomotive propulsion system is being controlled in a constant horsepower range, in which case the power reference value on the line 64 will be lower than the other two reference values. The selected value is supplied to the input of the memory means via the switch 508. The memory means 504 is so arranged that its output value is approximately the same as the value on the line 510 when the switch 508 changes states from closed to open. In other words, during any interval that the logic step 88 is in a TRIP state (i.e, while either the deration or recovery mode of operation is activated), the switch 508 is open and the memory means 504 is effective to remember and save whatever value was on the line 510 at the moment of time when this state began (i.e., at the start of a deration mode) and to hold such value substantially constant at its output.

As is illustrated in FIG. 13, the wheelslip correction value is subtracted from the output value of the memory means 504 at the summing point 502. The resulting difference is supplied via a switch 512, a line 66a, and another least-value gate 514 to the output line 66 of the wheelslip control function 65, and it is also supplied to the input of a source 516 labeled "RAMP UP." The switch 512 has two alternative positions or states: normally it is in the state shown in FIG. 13, thereby connecting the line 66a to the output of the source 516; but whenever the logic step 88 is in a TRIP state, the switch 512 is in its second state so as to connect the line 66a directly to the output of the summing point 502. The value on the line 66a (herein referred to as "WS Volts") will depend on the state of the switch 512. So long as this switch is in its second or TRIP state, WS Volts will be the same as the difference value at the output of the summing point 502, which value will now be equal to the relatively constant value that the memory means 504 is saving minus the wheelslip correction value derived from the summing means 90 (FIG. 5). Otherwise, WS Volts is determined by the source 516 which is so arranged as to increase this value to a predetermined maximum limit when activated by the state change of a normally closed switch 518 in response to the termination of the TRIP state (i.e., at the end of a recovery mode of operation).

The least-value gate 514 has two inputs, one coupled to the line 66a and the other coupled to the line 64. The gate 514 selects the smaller of its two input values as the reference signal value on the output line 66. It will be apparent that when the switch 508 is opened and the switch 512 concurrently changes to its second state at the start of a deration mode of operation, the gate 514 will become effective in conjunction with the summing point 502 to reduce the reference signal value on the line 66 to a level equal to WS Volts, and this reduction will usually continue until the subsequent recovery mode of operation causes the INT value and consequently the wheelslip correction value to decrease to zero, thereby terminating the TRIP state of the logic step 88. During the deration and recovery modes, WS Volts (and consequently the reference value on the line 66) equals the saved, constant value at the output of the memory means 504 minus the variable correction value. In effect, the saved value is a "snapshot" of the reference value at the moment of time when the deration mode is initiated. As a result, the degree of reference value correction (i.e., the amount of traction power reduction or deration) is desirably referenced to the control system parameters that existed at the start of deration, and once the wheelslip condition is cured and the recovery mode is concluded, the reference value on the line 66 will again equal its snapshot value. This provides a smooth and stable transition from wheelslip control to normal control of the locomotive propulsion system.

To provide the aforesaid WS INCONTRL indication, bistable polarity detecting means 520 is coupled to the output of a summing point 522 where the power reference value on the line 64 is compared with the WS Volts on the line 66a. So long as WS Volts is lower than the reference value on the line 64, the polarity detector 520 has a high output state to indicate that the wheelslip control function 65 is in control; otherwise the polarity detector will be in its low output state. The detector 520 will change from high to low states in response to WS Volts being increased or ramped up to the level of the reference value on line 64 when the source 516 is activated at the end of a recovery mode, as previously described, or in response to the power reference value on the line 64 decreasing below WS Volts at any time during the deration or recovery mode of operation. In the latter event, this state change de-activates the logic steps 91 and 88 (see FIG. 5), thereby terminating the TRIP state and at the same time causing the reset function 322 to reset the integrator 310 in the subsystem 300 (see FIG. 8), whereupon the INT value and consequently the wheelslip correction value are immediately returned to zero. The least-value gate 514 is always effective to prevent the reference signal value on the output line 66 from exceeding the value on the line 64.

FIG. 14 is a flow chart of the presently preferred software for implementing the reference signal reducing subroutine 616 shown functionally in FIG. 13. This subroutine is entered at an inquiry step 661 that tests the state of the aforesaid bistable trip flag. As previously explained (see the description of step 608 in FIG. 10 and of step 645 in FIG. 12), the trip flag will be in its true state (equivalent to the TRIP state of the OR logic step 88 in FIG. 5) during the deration and recovery modes of operation. In this event the answer to the inquiry 161 is yes, and the next step 662 is to test whether or not a bistable "slip in process" flag is in a set or true state. The latter step will have a negative answer the first time it is executed (i.e., on the first pass through the FIG. 14 subroutine after the trip flag has been changed to its true state by the step 608 [FIG. 10] at the beginning of a deration interval). Consequently the program will proceed from this step to a least-value selecting step 663 that reads the lowest one of the reference values on the three lines 51, 57 and 64 and loads it into a temporary register (herein referred to as the "old wheelslip volts" register) where it s saved as "Old WS Volts." The step 663 is followed by an initializing step 664 wherein the value loaded in the old wheelslip volts register and the values saved in the aforesaid old integrator value register and wheelslip correction value register are respectively incremented by an amount equal to 1/Nth of Old WS Volts, where N is a predetermined integer (e.g., 16). The incremented value in the old wheelslip volts register is now saved or remembered as "V-Sav" which is approximately the same as the lowest reference value at this time.

After the step 664 is executed, the wheelslip correction value derived at either the last step 638 in FIG. 11 (deration mode) or the last step 653 in FIG. 12 (recovery mode) is subtracted from the V-Sav value at a step 665 (equivalent to the summing point 502 in FIG. 13), and the difference is saved as WS Volts. The next step 666 tests the slip in process flag again. Initially the state of this flag is not true, and a step 667 is operative to change it to true before executing the succeeding inquiry step 668. Once the slip in process flag is thus set in its true state, during each subsequent pass through the FIG. 14 subroutine while the trip flag is true the program will proceed directly from the step 662 to the step 665, thereby bypassing the steps 663 and 664, and it will proceed directly from the step 666 to the step 668, thereby bypassing the step 667. As a result, the V-Sav value is loaded in the old wheelslip volts register at step 664 only during the first pass through this subroutine, and this value is not updated or changed again throughout the ensuing interval that the trip flag remains in its true state.

In the step 668 of the FIG. 14 subroutine, WS Volts is compared with the power reference value on the line 64. So long as the former is lower than the latter, the subroutine proceeds from the step 668 to a step 670 where the setting of the aforesaid "wheelslip in control" flag is changed, if this flag were then in its false or low state, to its true or high state (WS INCONTRL), and the FIG. 14 subroutine will then return to the wheelslip mode control routine (FIG. 10) via a final step 671 that makes the reference value on the output line 66 the same as WS Volts. Otherwise the subroutine would proceed from the step 668 to an alternative step 672 where the same flag is reset, if necessary, to its false state, and the final step 673 will now make the reference value on the output line 66 equal to the power reference value on the line 64. (It will be apparent that the steps 668, 670 and 672 perform the same functions as the summing point 522 and the bistable polarity detector 520 in FIG. 13, and the steps 668, 671 and 673 perform the same function as the least-value gate 514.)

Whenever the answer to the inquiry 668 changes from yes to no, the step 672 resets the wheelslip in control flag which causes the recovery mode of operation to terminate. In practice this will usually occur before the OLD INT value (and hence the wheelslip correction value) is reduced to zero, in which event the answer to the inquiry step 641 in the recovery/termination subroutine (FIG. 8) is no, the answer to the inquiry step 642 is yes, the steps 644 and 645 are executed to terminate the recovery mode, and there is an immediate, smooth, and stable transition from wheelslip control to the normal motoring mode of operation of the locomotive propulsion control system without any discontinuity in the power reference value on the output line 66. Note that this response would be obtained even if the reference value on the input line 64 were to increase by as much as six percent during the wheelslip control mode (as could happen if track speed were increasing). As was previously explained (see the description of the initializing step 664), throughout the wheelslip control mode the value stored in the old wheelslip volts register (V-Sav) preferably is slightly higher than (e.g., 106%) the value of the reference signal that existed on the line 64 at the moment of time when the deration interval was initiated (i.e., when the state of the trip flag changed from false to true), and therefore WS Volts will be just equal to this higher value whenever the wheelslip correction value is reduced to zero. In other words, the power reference value could be slightly higher at the conclusion of recovery than at the start of deration if required to restore the same constant level of traction power in spite of increased track speed.

After the trip flag is returned to its reset or false state at the end of a recovery interval (see step 645 in FIG. 12), the answer to the initial inquiry step 661 of the FIG. 14 subroutine will be no. In this event, the step 661 is followed by a step 675 which ensures that the slip in process flag is in its reset or false state. Then the saved value of WS Volts is checked to determine whether or not it is less than the aforesaid maximum limit "VLIM" which is greater than the highest reference value expected on the line 64. If not, the program would proceed directly from step 676 to step 668. Otherwise, it proceeds to the step 668 via an additional 677 that increments WS Volts by a predetermined amount VLIM/X. The denominator X is selected so that WS Volts will increase to its maximum limit at a desirably fast rate (corresponding, for example, to the rectified output voltage of the main alternator 12 increasing at approximately 16 volts per second). It will now be appreciated that the steps 676 and 677 perform the same function as the ramp-up source 516 shown in FIG. 13, and they are operative whenever the trip flag is not in its true state to ensure a negative answer at the inquiry step 668.

While a preferred embodiment of the invention has been shown and described by way of illustration, various modifications thereof will probably occur to persons skilled in the art. It is therefore intended by the concluding claims to cover all such changes and modifications as fall within the true spirit and scope of this invention.

We claim:

1. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source of electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:

a. first means for comparing the rotational speeds of the separately driven wheels of the vehicle and for detecting the highest and lowest speeds, respectively;
   b. second means associated with said first means for providing a reference speed value indicative of the rotational speed of a vehicle wheel that is not slipping;
   c. third means for determining a normally desired maximum difference between the reference speed indicated by said second means and a predetermined one of the speeds detected by said first means;

d. summing means associated with said first, second and third means for deriving a speed error value representative of the algebraic sum of said predetermined one speed, said reference speed and said maximum difference, said speed error value being zero whenever said one speed has a desired value;

e. multiplying means for deriving a voltage error value related to said speed error value by a variable gain that is a predetermined function of said reference speed value;

f. integrating means operative when the actual value of said one speed differs from the desired value in a predetermined direction for obtaining a wheelslip correction value that increases at an average rate that varies with said voltage error value; and g. means associated with said integrating means for reducing the value of said reference signal by an amount corresponding to said correction value.

2. The wheelslip control means of claim 1 wherein said variable gain increases from a predetermined minimum limit as said reference speed value increases from zero, whereby the ratio of said voltage error value to said speed error value is dependent on said reference speed value.

3. The wheelslip control means of claim 2 wherein said gain varies non-linearly with said reference speed value.

4. The wheelslip control means of claim 1 wherein said multiplying means includes means for setting said variable gain at a value that varies, between predetermined minimum and maximum limits, in accordance with approximately the second power of said reference speed value.

5. The wheelslip control means of claim 1 wherein said third means is operative to vary said normally desired maximum difference as a predetermined function of said reference speed.

6. The wheelslip control means of claim 5 wherein said third means includes means for preventing said normally desired maximum difference from decreasing below a predetermined minimum speed.

7. The wheelslip control means of claim 6 wherein said third means includes means for setting said maximum difference at a speed that is a variable percentage of said reference speed, said percentage varying inversely with said reference speed as said reference speed varies between predetermined first and second values.

8. The wheelslip control means of claim 7 wherein said percentage is variable between predetermined maximum and minimum limits and is not less than said minimum limit when said reference speed is higher than said second value.

9. The wheelslip control means of claim 1 in which said predetermined one speed is the highest speed detected by said first means, said summing means includes means for comparing the lowest speed detected by said first means and the reference speed indicated by said second means, and said summing means is so arranged that said speed error value varies with the amount, if any, that said highest speed exceeds the sum of said maximum difference and either said reference speed of said lowest speed, whichever is lower.

10. The wheelslip control means of claim 1 in which said integrating means when operative periodically increments and saves said wheelslip correction value, the size of each increment being proportional to said voltage error value and the number of such increments per second being constant.

11. The wheelslip control means of claim 10 in which said integrating means includes means for preventing the wheelslip correction increments from decreasing below a predetermined minimum size.

12. The wheelslip control means of claim 11 wherein said last-mentioned means is operative if said reference speed exceeds a predetermined, relatively low value to set said minimum size at a predetermined first value and is operative otherwise to set said minimum size at a predetermined second value lower than said first value.

13. The wheelslip control means of claim 10 in which means is provided for returning said wheelslip correction value to zero when said integrating means is not operative.

14. The wheelslip control means of claim 10 wherein said reference signal reducing means includes memory means effective while said wheelslip correction value is greater than zero for saving a value approximately the same as the value of said reference signal at the time when said integrating means becomes operative, and wherein said reference signal reducing means is arranged when said memory means is effective to reduce said reference signal value to a level equal to said saved value minus said correction value regardless of the value of said command signal.

15. The wheelslip control means of claim 1 which further comprises additional means responsive to said speed error value and operative when said integrating means is operative and said speed error value exceeds a predetermined level to effect a step increase of said wheelslip correction value.

16. The wheelslip control means of claim 15 wherein the size of said step increase depends on the amount by which said speed error value exceeds said predetermined level up to a predetermined maximum limit.

17. The wheelslip control means of claim 15 wherein the size of said step increase is equal to the product of said voltage error value and a variable multiplier that increases from zero as said speed error value increases from said predetermined level.

18. The wheelslip control means of claim 1 which further comprises wheelslip detection means for detecting the number of separately driven wheels of the vehicle that are slipping, as indicated by excessively high second derivatives of the rotational speeds of the individual wheels, and in which said second means is so arranged that said reference speed value normally varies with the rotational speed of a vehicle wheel that is not slipping but will not change appreciably if the number of slipping wheels is above a predetermined limit.

19. The wheelslip control means of claim 1 which further comprises means for respectively deriving the rates of change of rotational speeds of the separately driven wheels of the vehicle, means for comparing said rates of change and for detecting the highest one, and bistable means operative from a reset state to a set state in response to the highest rate increasing to at least a predetermined pickup level, and in which said second means is so arranged that said reference speed value normally varies with the rotational speed of a wheel that is not slipping but will not change appreciably if said bistable means is in its set state.

20. The wheelslip control means of claim 19 wherein said predetermined one speed is the highest speed detected by said first means, said speed error value is positive whenever the actual highest speed is greater than desired, said integrating means is operative when said speed error value is positive, and said second means includes means for reducing said reference speed value and for ensuring that said bistable means is in its reset state whenever the lowest speed detected by said first means is less than said reference speed.

21. The wheelslip control means of claim 1 which further comprises means for respectively deriving the rates of change of rotational speed of the separately driven wheels of the vehicle, means for comparing said rates of change and for detecting the lowest one, and bistable means operative from a reset state to a set state in response to the lowest rate increasing to at least a predetermined pickup level, and in which said second means is so arranged that said reference speed value normally varies with the rotational speed of a wheel that is not slipping but will not change appreciably if said bistable means is in its set state.

22. The wheelslip control means of claim 21 wherein said predetermined one speed is the highest speed detected by said first means, said speed error value is positive whenever the actual highest speed is greater than desired, said integrating means is operative when said speed error value is positive, and said second means includes means for reducing said reference speed value and for ensuring that said bistable means is in its reset state whenever the lowest speed detected by said first means is less than said reference speed.

23. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source of electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:

a. first means for comparing the rotational speeds of the separately driven wheels of the vehicle and for detecting the highest and lowest speeds, respectively;

b. second means associated with said first means for providing a reference speed value indicative of the rotational speed of a vehicle wheel that is not slipping;

c. third means for determining a normally desired maximum difference between the reference speed indicated by said second means and a predetermined one of the speeds detected by said first means;

d. summing means associated with said first, second and third means for deriving a speed error value representative of the algebraic sum of said predetermined one speed, said reference speed and said maximum difference, said speed error value being zero whenever said one speed has a desired value;

e. integrating means associated with said summing means and operative when the actual value of said one speed differs from the desired value in a predetermined direction for obtaining a wheelslip correction value that increases at an average rate that is a predetermined function of said speed error value;

f. additional means associated with said integrating means and operative when the actual value of said one speed does not differ from said desired value in said predetermined direction and said wheelslip correction value is greater than zero for decreasing said correction value at an average rate that is independent of said speed error value; and g. means associated with said integrating means for reducing the value of said reference signal by an amount corresponding to said correction value.

24. The wheelslip control means of claim 23 wherein said additional means includes means responsive to said reference speed value for varying said rate of decrease as a predetermined function of said reference speed.

25. The wheelslip control means of claim 24 wherein said rate of decrease varies with said reference speed so long as said reference speed exceeds a predetermined value.

26. The wheelslip control means of claim 25 wherein said rate of decrease equals a predetermined minimum rate whenever said reference speed is less than said predetermined value.

27. The wheelslip control means of claim 24 in which said additional means is arranged when operative periodically to decrement and save said wheelslip correction value, the size of each decrement being dependent on said reference speed value and the number of such decrements per second being constant.

28. The wheelslip control means of claim 27 wherein the wheelslip correction decrements are not less than a predetermined minimum size so long as said correction value equals or exceeds said minimum size.

29. The wheelslip control means of claim 27 wherein said additional means is inoperative to decrement said wheelslip correction value when said correction value has returned to zero.

30. The wheelslip control means of claim 23 wherein said predetermined one speed is the highest speed detected by said first means, said speed error value is positive whenever the actual highest speed is greater than desired, said integrating means is operative when said speed error value is positive, said reference signal reducing means includes memory means effective so long as said wheelslip correction value is greater than zero for saving a value approximately the same as the value of said reference signal at the time when said speed error increases from zero to a positive value, and said reference signal reducing means is arranged when said memory means is effective to reduce said reference signal value to a level equal to said saved value minus said correction value regardless of the value of said command signal.

31. The wheelslip control means of claim 30 for a propulsion system having regulating means responsive to said command signal for normally determining the value of said reference signal, wherein said reference signal reducing means includes means for preventing the reference signal from exceeding the value normally determined by said regulating means.

32. The wheelslip control means of claim 31 which further comprises bistable means having first and second states, said bistable means being in its first state whenever the reference signal value normally determined by said regulating means is lower than said reduced level and being arranged upon changing from second to first states to reset said integrating means, whereupon said correction value returns to zero.

33. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source of electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:
  a. first means for comparing the rotational speeds of the separately driven wheels of the vehicle and for detecting the highest and lowest speeds, respectively;
  b. second means associated with said first means for providing a reference speed value indicative of the rotational speed of a vehicle wheel that is not slipping;
  c. third means for determining a normally desired maximum difference between the reference speed indicated by said second means and a predetermined one of the speeds detected by said first means;
  d. summing means associated with said first, second and third means for deriving a speed error value representative of the algebraic sum of said predetermined one speed, said reference speed and said maximum difference, said speed error value being zero whenever said one speed has a desired value;
  e. means responsive to said speed error value for deriving a voltage error value that is a predetermined function of said speed error value;
  f. integrating means operative when the actual value of said one speed differs from the desired value in a predetermined direction for obtaining a wheelslip correction value that increases at an average rate that varies with said voltage error value;
  g. memory means effective while said wheelslip correction value is greater than zero for saving a value approximately the same as the value of said reference signal at the time when said integrating means becomes operative, said saved value being substantially constant; and
  h. means associated with said integrating means and operative while said memory means is effective for reducing said reference signal value to a level equal to said saved value minus said correction value regardless of the value of said command signal.

34. The wheelslip control means of claim 33 which further comprises additional means responsive to said speed error value and operative when said integrating means is operative and said speed error value exceeds a predetermined first level to increase said wheelslip correction value by an amount that is related to said voltage error value by a variable coefficient, whereby said correction value varies with the sum of said last-mentioned amount and an amount that is representative of the time integral of said voltage error value.

35. The wheelslip control means of claim 34 wherein said additional means includes means for varying said coefficient between zero and a predetermined maximum number as said speed error value varies between said first level and a predetermined second level higher than said first level.

36. The wheelslip control means of claim 33 wherein said voltage error value deriving means is so arranged that said voltage error value is related to said speed error value by a gain that varies, between predetermined limits, with said reference speed value.

37. The wheelslip control means of claim 33 for a propulsion system having regulating means responsive to said command signal for normally determining the value of said reference signal, wherein said reference signal reducing means includes means for preventing the reference signal from exceeding the value normally determined by said regulating means.

38. The wheelslip control means of claim 37 which further comprises bistable means having first and second states, said bistable means being in its first state whenever the reference signal value normally determined by said regulating means is lower than said reduced level and being arranged upon changing from second to first states to reset said integrating means, whereby said correction value then returns to zero.

39. The wheelslip control means of claim 38 wherein said predetermined one speed is the highest speed detected by said first means, said speed error value is positive whenever the actual highest speed is greater than desired, and said integrating means is operative when said speed error value is positive.

40. The wheelslip control means of claim 39 for a propulsion system having means for sensing the magnitude of electric power output of the source, wherein said regulating means is operative to vary said reference signal value as necessary to minimize any error between the sensed magnitude of power and a desired magnitude thereof.

41. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source o electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:

a. first means for comparing the rotational speeds of the separately driven wheels of the vehicle and for detecting the highest and lowest speeds, respectively;

b. second means for respectively deriving the rates of change of rotational speeds of said separately driven wheels;

c. third means for comparing said rates of change and for detecting the highest one;

d. bistable means operative from a reset state to a set state in response to the highest rate increasing to at least a predetermined pickup level;

e. wheelslip detection means for detecting the number of said separately driven wheels that are slipping, as indicated by excessively high derivatives of the rates of change derived by said second means;

f. reference speed indicating means associated with said first means for providing a reference speed value that normally varies with the rotational speed of a vehicle wheel that is not slipping but that will not change appreciably if either the number of slipping wheels is above a predetermined limit or said bistable means is in its set state;

g. means for determining a normally desired maximum difference between the reference speed indicated by said second means and a predetermined one of the speeds detected by said first means;

h. summing means for deriving a speed error value representative of the algebraic sum of said predetermined one speed, said reference speed and said maximum difference, said speed error value being zero whenever said one speed has a desired value;

j. means responsive to said speed error value for deriving a voltage error value that is a predetermined function of said speed error value;

k. integrating means operative when the actual value of said one speed differs from the desired value in a predetermined direction for obtaining a wheelslip correction value that increases at an average rate that varies with said voltage error value; and m. means associated with said integrating means for reducing the value of said reference signal by an amount corresponding to said correction value.

42. The wheelslip control means of claim 41 wherein said voltage error value deriving means is so arranged that said voltage error value is related to said speed error value by a variable gain that increases from a predetermined minimum limit as said reference speed value increases from zero.

43. The wheelslip control means of claim 41 wherein said reference speed indicating means is so arranged that normally said reference speed value will change at a rate corresponding to the rate at which said lowest speed is varying while the vehicle is being propelled by the motors.

44. The wheelslip control means of claim 43 wherein said reference speed indicating means includes means for preventing the rate of change of said reference speed value from exceeding a predetermined maximum rate.

45. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source of electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:

a. first means for comparing the rotational speeds of the separately driven wheels of the vehicle and for detecting the highest and lowest speeds, respectively;

b. second means associated with said first means for providing a reference speed value indicative of the rotational speed of a vehicle wheel that is not slipping;

c. third means for determining a normally desired maximum difference between the reference speed indicated by said second means and a predetermined one of the speeds detected by said first means;

d. summing means associated with said first, second and third means for deriving a speed error value representative of the algebraic sum of said predetermined one speed, said reference speed and said maximum difference, said speed error value being zero whenever said one speed has a desired value;

e. wheelslip detection means for detecting the number of separately driven wheels that are slipping, as indicated by excessively high second derivatives of the rotational speeds of the individual wheels;

f. additional means coupled to said wheelslip detection means for determining whether or not the number of slipping wheels is above a predetermined limit;

g. means associated with said additional means and said summing means and effective when the number of slipping wheels is above said limit to change the desired value of said one speed by a variable amount that increases with the length of time that the number of slipping wheels is above said limit, said desired-value change tending to increase said speed error value in a positive direction;

h. means associated with said summing means and operative when said speed error value is positive for obtaining a wheelslip correction value that is a predetermined function of said speed error value; and j means responsive to said wheelslip correction value for reducing the value of said reference signal by an amount corresponding to said correction value.

46. The wheelslip control means of claim 45 wherein said predetermined one speed is the highest speed detected by said first means, said speed error value is positive whenever the actual highest speed is greater than desired, and said summing means is so arranged that said desired speed equals the sum of said reference speed plus said normally desired maximum difference minus said variable amount.

47. The wheelslip control means of claim 45 wherein said reference signal reducing means includes memory means effective while said wheelslip correction value is greater than zero for saving a value approximately the same as the value of said reference signal at the time when said speed error value becomes positive, and wherein said reference signal reducing means is arranged when said memory means is effective to reduce said reference signal value to a level equal to said saved value minus said correction value regardless of said command signal.

48. The wheelslip control means of claim 45 wherein said second means is so arranged that said reference speed value normally varies with the rotational speed of a vehicle wheel that is not slipping but will not change appreciably if the number of slipping wheels is above said predetermined limit.

49. The wheelslip control means of claim 48 wherein said second means is so arranged that said reference speed value will not change appreciably if the number of slipping wheels equals or exceeds said predetermined limit.

50. The wheelslip control means of claim 48 in which said means for obtaining said wheelslip correction value is operative when said speed error value is positive and exceeds a predetermined level to increase said wheelslip correction value by an amount that varies with the difference between said speed error value and said predetermined level.

51. The wheelslip control means of claim 45 wherein said variable amount increases from zero at a rate that varies with the maximum difference speed determined by said third means.

52. The wheelslip control means of claim 51 wherein said desired-value changing means includes timing means for measuring the time that the number of slipping wheels is above said limit, said variable amount being proportional to the product of the measured time and said maximum difference.

53. The wheelslip control means of claim 51 in which said variable amount is proportional to the product of said maximum difference speed and a variable factor that increases from 0 toward a maximum of 1.0 with the length of time that the number of slipping wheels is above said limit, and in which said desired-value changing means includes means operative in response to the number of slipping wheels decreasing from above said limit to a number not above said limit for preventing said variable factor from decreasing to 0 until the number of slipping wheels decreases below said limit, whereupon said last-mentioned means resets said factor to 0.

54. The wheelslip control means of claim 51 wherein said desired-value changing means includes means operative when said maximum difference is less than a predetermined minimum speed to prevent said rate of increase from falling below a predetermined minimum rate.

55. The wheelslip control means of claim 51 wherein said variable amount increases at a variable rate from zero to an upper limit proportional to the maximum difference determined by said third means.

56. The wheelslip control means of claim 55 wherein said upper limit is at least approximately twice said maximum difference.

57. The wheelslip control means of claim 45 in which said desired-value changing means includes means for abruptly reducing said variable amount to zero in response to the number of slipping wheels decreasing from above to below said predetermined limit.

58. The wheelslip control means of claim 57 in which said desired-value changing means is normally effective to hold said variable amount relatively constant so long as the number of slipping wheels equals said predetermined limit.

59. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source of electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:

a. first means for comparing the rotational speeds of the separately driven wheels of the vehicle and for detecting the highest and lowest speeds, respectively;

b. second means associated with said first means for providing a reference speed value indicative of the rotational speed of a vehicle wheel that is not slipping;

c. third means for determining a normally desired maximum difference between the reference speed indicated by said second means and a predetermined one of the speeds detected by said first means;

d. summing means associated with said first, second and third means for deriving a speed error value representative of the algebraic sum of said predetermined one speed, said reference speed and said maximum difference, said speed error value being zero whenever said one speed has a desired value;

e. means for respectively deriving the rates of change of rotational speeds of the separately driven wheels of the vehicle, for comparing said rates, and for detecting the lowest one;

f. bistable means operative from a reset state to a set state in response to the lowest rate increasing to at least a predetermined pickup level;

g. means associated with said summing means and effective when said bistable means is in its set state to change the desired value of said one speed by a variable amount that increases with the length of time that said bistable means is in its set state, said desired-value change tending to increase said speed error value in a positive direction;

h. means associated with said summing means and operative when said speed error value is positive for obtaining a wheelslip correction value that is a predetermined function of said speed error value; and j. means responsive to said wheelslip correction value for reducing the value of said reference signal by an amount corresponding to said correction value.

60. The wheelslip control means of claim 59 wherein said means for obtaining said wheelslip correction value is operative when said speed error value is positive and exceeds a predetermined level to increase said wheelslip correction value by an amount that varies with the difference between said speed error value and said predetermined level.

61. The wheelslip control means of claim 59 wherein said variable amount increases from zero at a rate that varies with the maximum difference speed determined by said third means.

62. The wheelslip control means of claim 61 wherein said desired-value changing means includes timing means for measuring the time that said bistable means is in its set state, said variable amount being proportional to the product of the measured time and said maximum difference.

63. The wheelslip control means of claim 61 wherein said desired-value changing means includes means operative when said maximum difference is less than a predetermined minimum speed to prevent said rate of increase from falling below a predetermined minimum rate.

64. The wheelslip control means of claim 61 wherein said variable amount increases at a variable rate from zero to an upper limit proportional to the maximum difference determined by said third means.

65. The wheelslip control means of claim 64 wherein said desired-value changing means includes means operative when said maximum difference is less than a predetermined minimum speed to prevent the rate at which said variable amount increases from falling below a predetermined minimum rate.

66. The wheelslip control means of claim 64 wherein said upper limit is at least approximately twice said maximum difference.

67. The wheelslip control means of claim 59 in which said means for deriving, comparing and detecting the rates of change of wheel speeds is arranged to detect both the lowest and the highest rates of the separately driven wheels, in which second bistable means is provided, said second bistable means being operative from a reset state to a set state in response to the highest rate increasing to at least said predetermined pickup level, and in which said second means is so arranged that said reference speed value normally varies with the rotational speed of a vehicle wheel that is not slipping but will not change appreciably if said second bistable means is in its set state.

68. The wheelslip control means of claim 59 wherein said reference signal reducing means includes memory means for saving a value that normally is approximately the same as said reference signal value, said memory means being effective so long as said speed error value is positive to hold said saved value substantially constant, and wherein said reference signal reducing means is arranged when said memory means is effective to reduce said reference signal value to a level equal to said saved value minus said correction value regardless of said command signal.

69. The wheelslip control means of claim 59 which further comprises wheelslip detection means for detecting the number of separately driven wheels of the vehicle that are slipping, as indicated by excessively high derivatives of the rates of change of rotational speeds of the individual wheels, and additional means coupled to said wheelslip detection means for determining whether or not the number of slipping wheels is above a predetermined limit, and in which said desired-value changing means is effective when either said bistable means is in its set state or the number of slipping wheels is above said limit.

70. The wheelslip control means of claim 69 in which said second means is so arranged that said reference speed value normally varies with the rotational speed of a vehicle wheel that is not slipping but will not change appreciably if either said bistable means is in its set state or the number of slipping wheels is above said limit.

71. The wheelslip control means of claim 69 wherein said variable amount increases from zero at a rate that varies with the maximum difference speed determined by said third means.

72. The wheelslip control means of claim 71 in which said variable amount is proportional to the product of said maximum difference speed and a variable factor that increases from 0 toward a maximum of 1.0 with the length of time that said bistable means is in its set state or the number of slipping wheels is above said limit, and in which said desired-value changing means includes means operative while said bistable means is in its reset state and the number of slipping wheels is not above said limit for preventing said variable factor from decreasing to 0 until the number of slipping wheels decreases below said limit, whereupon said factor is reset to 0.

73. The wheelslip control means of claim 69 wherein said means for obtaining said wheelslip correction value includes: proportional means operative when said speed error value is positive and exceeds a predetermined level for deriving a variable value that depends on the amount by which said speed error value exceeds said predetermined level; and means for increasing said correction value by an amount equal to said variable value.

74. The wheelslip control means of claim 73 wherein said means for obtaining said wheelslip correction value includes integrating means operative when said speed error value is positive for deriving a second variable value that increases at a an average rate that depends on said speed error value, said wheelslip correction value comprising the sum of said variable values.

75. The wheelslip control means of claim 59 for a propulsion system comprising means for deriving a second feedback signal having a value representative of the magnitude of current in said plurality of motors, which further comprises means for varying said pickup level as a function of the value of said second feedback signal.

76. The wheelslip control means of claim 75 wherein said pickup level varying means includes means for determining maximum and minimum limits between which said pickup level can vary, said pickup level remaining equal to said minimum limit when said second feedback value is below a first value and remaining equal to said maximum limit when said second feedback value is relatively high.

77. The wheelslip control means of claim 59 in which said second means is so arranged that said reference speed value normally varies with the rotational speed of a vehicle wheel that is not slipping but will not change appreciably if said bistable means is in its set state.

78. The wheelslip control means of claim 77 in which said means for deriving, comparing and detecting the rates of change of wheel speeds is arranged to detect both the lowest and the highest rates of the separately driven wheels, in which second bistable means is provided, said second bistable means being operative from a reset state to a set state in response to the highest rate increasing to at least said predetermined pickup level, and in which said second means is so arranged that said reference speed value normally varies with the rotational speed of a vehicle wheel that is not slipping but will not change appreciably if either one of said bistable means is in its set state.

79. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source of electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:
  a. first means for comparing the rotational speeds of the separately driven wheels of the vehicle and for detecting the highest and lowest speeds, respectively;
  b. second means associated with said first means for providing a reference speed value indicative of the rotational speed of a vehicle wheel that is not slipping;
  c. third means for determining a normally desired maximum difference between the reference speed indicated by said second means and a predetermined one of the speeds detected by said first means;
  d. fourth means for respectively deriving the rates of change of rotational speeds of the separately driven wheels of the vehicle;
  e. fifth means associated with said fourth means for comparing said rates of change and for providing a rate value representative of the highest rate of change;
  f. bistable means operative from a reset state to a set state in response to said rate value increasing to at least a predetermined pickup level;
  g. first summing means associated with said first, second and third means for deriving a speed error value representative of the algebraic sum of said predetermined one speed, said reference speed and said maximum difference, said speed error value being zero whenever said one speed has a desired value;
  h. integrating means associated with said first summing means and operative when the actual value of said one speed differs from the desired value in a predetermined direction for obtaining a first variable value that increases at an average rate that is a predetermined function of said speed error value;
  j. additional means effective when said bistable means is in its set state for obtaining a second variable value that depends on the value of said feedback signal;
  k. second summing means associated with said integrating means and said additional means for deriving a wheelslip correction value that varies with the sum of said first and second variable values; and
  m. means responsive to said wheelslip correction value for reducing the value of said reference signal by an amount corresponding to said correction value.

80. For inclusion in a propulsion system of a traction vehicle having a plurality of wheels that are subject to slipping with respect to the surface on which the vehicle travels, the system comprising a plurality of adjustable speed electric motors mechanically coupled in driving relationship to separate wheels of the vehicle, a controllable source of electric power the output of which is electrically coupled in energizing relationship to the respective motors, means associated with the source of power for varying the magnitude of its output current or voltage in accordance with a variable control signal, means for deriving a feedback signal representative of the actual current or voltage magnitude, and a plurality of means for respectively sensing the rotational speeds of the separately driven wheels, said control signal being provided by a controller to which the speed sensing means are coupled and which is operative to vary the control signal as necessary to minimize any difference between the feedback signal and a reference signal the value of which normally depends on the value of a variable command signal, improved wheelslip control means comprising:
  a. first means for comparing the rotational speeds of the separately driven wheels of the vehicle and for detecting the highest and lowest speeds, respectively;
  b. second means associated with said first means for providing a reference speed value indicative of the rotational speed of a vehicle wheel that is not slipping;
  c. third means for determining a normally desired maximum difference between the reference speed indicated by said second means and a predetermined one of the speeds detected by said first means;
  d. fourth means for respectively deriving the rates of change of rotational speeds of the separately driven wheels of the vehicle;
  e. fifth means associated with said fourth means for comparing said rates of change and for providing a rate value representative of the highest rate of change;
  f. bistable means operative from a reset state to a set state in response to said rate value increasing to at least a predetermined pickup level;
  g. first summing means associated with said first, second and third means for deriving a speed error value representative of the algebraic sum of said predetermined one speed, said reference speed and said maximum difference, said speed error value being zero whenever said one speed has a desired value;
  h. integrating means associated with said first summing means and operative when the actual value of said one speed differs from the desired value in a predetermined direction for obtaining a first variable value that increases at an average rate that is a predetermined function of said speed error value;

j. additional means associated with said fifth means and effective when said bistable means is in its set state for obtaining a second variable value that depends on said rate value;

k. second summing means associated with said integrating means and said additional means for deriving a wheelslip correction value that varies with the sum of said first and second variable values; and m. means responsive to said wheelslip correction value for reducing the value of said reference signal by an amount corresponding to said correction value.

81. The wheelslip control means of claim 80 in which said second means is so arranged that said reference speed value normally varies with the rotational speed of a vehicle wheel that is not slipping but will not change appreciably if said bistable means is in its set state.

82. The wheelslip control means of claim 80 wherein said additional means is so arranged that said second variable value varies with the product of the rate value and the value of said feedback signal.

83. The wheelslip control means of claim 82 wherein said second variable value is a predetermined percentage of said product, and wherein means responsive to said reference speed is provided for determining said percentage.

84. The wheelslip control means of claim 82 for a propulsion system comprising means for deriving a second feedback signal having a value representative of the magnitude of current in said plurality of motors, which further comprises means for varying said pickup level as a predetermined function of the value of said second feedback signal.

85. The wheelslip control means of claim 80 which further comprises means responsive to said speed error value for deriving a voltage error value that is a predetermined function of said speed error value, and in which said integrating means is so arranged that said first variable value is representative of the time integral of said voltage error value.

86. The wheelslip control means of claim 85 which further comprises means associated with said first summing means and said voltage error value deriving means and operative when said speed error value exceeds a predetermined level for obtaining a third variable value related to said voltage error value by a coefficient that is a predetermined function of said speed error value, said second summing means being so arranged that said wheelslip correction value corresponds to the sum of said first, second and third variable values.

87. The wheelslip control means of claim 80 wherein said reference signal reducing means includes memory means effective while said wheelslip correction value is greater than zero for saving a value approximately the same as the value of said reference signal at the time when said correction value is first derived, said saved value being substantially constant, and wherein said reference signal reducing means is arranged when said memory means is effective to reduce said reference signal value to a level equal to said saved value minus said correction value regardless of the value of said command signal.

88. The wheelslip control means of claim 80 for a propulsion system comprising means for deriving a second feedback signal having a value representative of the magnitude of current in said plurality of motors, which further comprises means for varying said pickup level as a predetermined function of the value of said second feedback signal.

89. The wheelslip control means of claim 88 wherein said bistable means is operative from its set state to its reset state in response to said rate value decreasing to less than a predetermined fraction of said pickup level.

90. The wheelslip control means of claim 88 wherein said pickup level varying means is so arranged as to vary said pickup level with the adhesion level of the vehicle wheels on said surface, as indicated by the relative magnitude of motor current, as said adhesion level varies between predetermined first and second percentages.

91. The wheelslip control means of claim 90 wherein said pickup level varying means includes means for determining maximum and minimum limits between which said pickup level can vary, said pickup level remaining equal to said minimum limit when said adhesion level is lower than said first percentage and remaining equal to said maximum limit when said adhesion level is higher than said second percentage.

* * * * *